(12) United States Patent
Chan et al.

(10) Patent No.: US 11,762,534 B2
(45) Date of Patent: *Sep. 19, 2023

(54) SELF-SERVICE AUTOMATED SWEEPS

(71) Applicant: Goldman Sachs & Co. LLC, New York, NY (US)

(72) Inventors: Helen Lee Chan, East Brunswick, NJ (US); Joe Peace Hopgood, Brooklyn, NY (US); Moses Song, New York, NY (US); Bruce John Horner, New York, NY (US); Lingyan Hu, Brooklyn, NY (US)

(73) Assignee: GOLDMAN SACHS & CO. LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,725

(22) Filed: May 15, 2022

(65) Prior Publication Data

US 2022/0269383 A1    Aug. 25, 2022

Related U.S. Application Data

(63) Continuation of application No. 17/349,312, filed on Jun. 16, 2021, now Pat. No. 11,385,771.

(Continued)

(51) Int. Cl.
*G06F 3/0482* (2013.01)
*G06F 16/22* (2019.01)
(Continued)

(52) U.S. Cl.
CPC .......... *G06F 3/0482* (2013.01); *G06F 3/0486* (2013.01); *G06F 3/04845* (2013.01);
(Continued)

(58) Field of Classification Search
CPC .... G06F 21/31; G06F 2221/2115; G06F 1/00; G06F 3/00; G06F 5/00; G06F 7/00;
(Continued)

(56) References Cited

U.S. PATENT DOCUMENTS

| | | | | |
|---|---|---|---|---|
| 2010/0076946 | A1* | 3/2010 | Barker | G06F 16/176 715/255 |
| 2012/0284127 | A1* | 11/2012 | Heiser, II | G06Q 30/0255 705/14.66 |

OTHER PUBLICATIONS

Mozilla. "Web APIs." MDN Web Docs, Mozilla.org, May 9, 2020, 20 pages, [Online] [Retrieved Oct. 18, 2021], Retrieved from the Internet Archive <URL:https://web.archive.org/web/20200509235200/ https://developer. mozilla.org/en-US/docs/Web/API>.

(Continued)

*Primary Examiner* — Rayeez R Chowdhury
(74) *Attorney, Agent, or Firm* — Fenwick & West LLP

(57) ABSTRACT

A system and a method are disclosed for simulating asset transfers (e.g., sweeps) using a user interface generated by various collections of display routines. A sweep management system may generate a graphical user interface (GUI) on a webpage to simulate sweeps. The GUI may include a list of entities rendered using a first collection of display routines and a graphical representation of some of the entities rendered using a second collection of display routines. The graphical representation may be rendered using a shared webpage object. Furthermore, callback functions are executed to perform operations based on user interactions. For example, callback functions are used to update the graphical representation after a user has dragged and dropped an entry from the list into the graphical representation.

23 Claims, 11 Drawing Sheets

Related U.S. Application Data

(60) Provisional application No. 63/088,028, filed on Oct. 6, 2020, provisional application No. 63/039,459, filed on Jun. 16, 2020.

(51) Int. Cl.
*G06F 3/04845* (2022.01)
*G06F 3/0486* (2013.01)
*G06Q 10/105* (2023.01)
*G06Q 40/02* (2023.01)
*G06Q 10/067* (2023.01)
*G06Q 10/10* (2023.01)
*G06Q 20/02* (2012.01)

(52) U.S. Cl.
CPC ....... *G06F 16/2228* (2019.01); *G06Q 10/105* (2013.01); *G06Q 40/02* (2013.01); *G06F 2203/04806* (2013.01); *G06Q 10/067* (2013.01); *G06Q 10/103* (2013.01); *G06Q 20/02* (2013.01)

(58) Field of Classification Search
CPC ... G06F 9/00; G06F 8/00; G06F 12/00; G06F 11/00; G06F 13/00; G06F 15/00; G06F 16/94; G06F 16/951; G06F 16/9535; G06F 3/0482; G06F 16/24575; G06F 16/285; G06F 16/338; G06F 16/9562; G06F 16/957; G06F 3/0484; G06F 9/5016; G06F 9/542; G06F 16/2228; G06F 16/24578; G06F 16/29; G06F 16/9577; G06F 16/958; G06F 21/602; G06F 21/6209; G06F 21/6227; G06F 2203/04806; G06F 3/016; G06F 3/04845; G06F 3/0486; G06F 40/103; G06F 40/106; G06F 40/14; G06F 40/143
See application file for complete search history.

(56) References Cited

OTHER PUBLICATIONS

PCT International Search Report and Written Opinion, PCT Application No. PCT/IB2021/055338, dated Sep. 23, 2021, 10 pages.

* cited by examiner

200

| | | |
|---|---|---|
| ✕ Restaurant Corp. / Cash Concentration | | |
| New Structure | Save as Draft | Submit for Approval |

Name Structure — Structure Nickname
Restaurant Corp. Payroll Sweep

Select Sources
Entities: Select ⌄
Loan Interest Rate: Enter value %

Set Cash Concentration Type
Type: Select ⌄

Balance / Limit Sharing
Type: No Sharing ⌄

Set Structure Features
Type 
● One Way Sweep
○ Two Way Sweep

Sweep Time: Select ⌄

Sweep Variant: Select ⌄
Transfer in Multiples: 0.00

Schedule
Frequency: Daily ⌄
Start: May 8, 2020 
Start:
● Never
○ On May 8, 2021 

Set Accounts — Add Sub-accounts

| | | |
|---|---|---|
| ✕ Restaurant Corp. / Accounts / Cash Concentration | | Edit ⋮ |
| Restaurant Corp. Payroll Sweep (CC-123456-1 / CCN01) | | |
| • Active | | |
| Instructions Reports | | |
| Define structure | Entities | Loan Interest Rate |
| | Pizza House, Taco Bowl, Kathmandu Fried Chicken | 1.7% |
| Cash Concentration Type | Entities | Loan Interest Rate |
| | Target | USD 1,000 |
| Structure Features | Type | Time |
| | One Way Sweep | 11AM |
| | Sweep Variant | Transfer in Multiples |
| | Net | 0.5 |
| Schedule | Frequency | Start | End |
| | Daily | May 8, 2020 | Never |

| Accounts | Visualizer/Simulate | Aggregated balance 999,345,678.99 USD |

1–4 of 4 accounts ⟩                                                 Search 🔍

| Name | Acct No ▲ | Entity | Location | Status | Parent | Type | CCY | Target | Balance |
|---|---|---|---|---|---|---|---|---|---|
| PH-US-Mstr ⌃ | 8759 | PH | USA | • Active | – | – | USD | 0.00 | 1.00 ⋮ |
| ∟ PH-US-1 | 8759 | PH | USA | • Active | PH-Mstr | Sweep | USD | 0.00 | 4,567.89 ⋮ |
| ∟ PH-US-2 ⌃ | 8759 | PH | USA | • Active | PH-Mstr | Cover | USD | 0.00 | -123.00 ⋮ |
| ∟ PH-US-3 | 8759 | PH | USA | • Active | PH-US-2 | Sweep | USD | 0.00 | 4,567.89 ⋮ |

✕ New Structure

Account Structure

③ ⊕

⊕ ⌄

Entity 2
Entity 2.2 (00159357464) — 414
Balance USD 6,468,372.00
Cap Amt     USD 1,000.00
Floor Amt   USD 0.00
Sweep ⊘
Cover ⊘

⊕

Entity 1.0 (00989655357) — 416
Balance USD 6,468,372.00
Cap Amt     USD 1,000.00
Floor Amt   USD 0.00
Sweep ⊘
Cover ⊘

⊕

Entity 2
Entity 2.5 (69887441235) — 415
Balance USD 6,468,372.00
Cap Amt     USD 1,000.00
Floor Amt   USD 0.00
Sweep ⊘
Cover ⊘

[ Apply ]

⎫
⎬ 410
⎭

Select Accounts

Add External Account

🔍 Search 1-5 of 55 accounts ‹ ›     All entities ›

| | Entity | Name | Number | Location |
|---|---|---|---|---|
| ⋮⋮ ☐ | Entity 2 | Entity 2.0 | 00335769412 | USA |
| ⋮⋮ ☐ | Entity 2 | Entity 2.1 | 00349759157 | USA |
| ⋮⋮ ☐ | Entity 2 | Entity 2.2 | 00159357464 | USA |
| ⋮⋮ ☐ | Entity 2 | Entity 2.3 | 32312115935 | USA |
| ⋮⋮ ☐ | Entity 2 | Entity 2.4 | 42135974568 | USA |
| ⋮⋮ ☐ | Entity 2 | Entity 2.5 | 69887441235 | USA |
| ⋮⋮ ☐ | Entity 3 | Entity 3.0 | 00327126459 | USA |
| ⋮⋮ ☐ | Entity 4 | Entity 4.0 | 00785965412 | USA |
| ⋮⋮ ☐ | Entity 4 | Entity 4.1 | 00246813795 | USA |
| ⋮⋮ ☐ | Entity 4 | Entity 4.2 | 00831279248 | USA |

SELF-SERVICE AUTOMATED SWEEPS

CROSS REFERENCE To RELATED APPLICATIONS

This application is a continuation of U.S. patent application Ser. No. 17/349,312, filed on Jun. 16, 2021, which claims the benefit of U.S. Provisional Application No. 63/039,459, filed Jun. 16, 2020, and U.S. Provisional Application No. 63/088,028, filed Oct. 6, 2020, which are incorporated by reference in their entireties.

TECHNICAL FIELD

The subject matter described relates generally to user interfaces and, in particular, to a user interface for users to define and implement set of sweeps between entities within a graphical user interface.

BACKGROUND

A large organization often possesses assets that are divided among entities of the organization. One example of an entity may be a banking account holding cash. A restaurant management company may have a large number of accounts with financial institutions holding cash (and sometimes other assets) for various purposes. Asset transfers, such as sweeps, enable the company's cash to be added or removed from an account at a specified time to ensure (or at least attempt to ensure) that the assets in the account meets specified criteria (e.g., a target balance). Existing approaches to setting up sweeps typically require an account holder to speak with a person at the financial institution or institutions with which they hold accounts who then sets them up manually. This is inefficient and it may take a significant amount of time (e.g., several days) for a sweep to be setup. Furthermore, even with a relatively modest number of accounts and sweeps, it can quickly become hard to track what assets will be moved to which accounts, leading to unexpected and possibility detrimental results.

SUMMARY

A sweep management system generates and updates a graphical user interface (GUI) for defining and simulating asset transfers between entities of an organization. By generating the GUI for an user at an organization, the sweep management system allows the user to build and visualize simple to complex asset transfer relationships (e.g., sweeps) without relying upon a third party institution to perform these operations for them. In one example, this self-service automation of sweeps can quickly serve a restaurant management corporation, whose operations may require assets to be transferred among restaurants across the globe, in determining when, where, and how much assets should be transferred among its restaurants' banking accounts.

For an intuitive and informative user interface for setting up sweeps, various collections of display routines (e.g., JavaScript® libraries) may be used to render different portions of the interface. Each collection may serve a different function in enabling a sweep to be set up. For example, one collection may render an interactive graphic of accounts in an existing sweep and another may render an interactive table listing accounts that can be added to the existing sweep. The variety in collections for generating the interface may increase how informative the interface is by allowing more information to be displayed in organized ways. However, rendering an intuitive user interface is difficult when a portion rendered using one collection relies upon information from another portion using another collection to maintain the information. That is, there may be an absence of or limitation in communication between the various collections that render the same interface. This may prevent users from making intuitive interactions that start at a portion of the interface managed by one collection and end at a portion of the interface managed by another collection.

In various embodiments, the GUI allows for intuitive user interactions between different portions of the interface. In particular, the sweep management system updates the GUI based on user interactions that may involve, within each interaction, collections of display routines used to manage different portions of the interface. The sweep management system increases the communication between these collections that are used together to generate the GUI. By leveraging a shared reference in a representation of the GUI that can be manipulated using various collections, the sweep management system can pass information or instructions between the collections and enable not only more user interactions, but more intuitive user interactions within the GUI.

In one embodiment for communicating between collections of display routines to update a GUI, the sweep management system generates, for display at a webpage on a client device, a list of entities using a first collection of display routines. Each entry in the list, or "list entry," may represent a respective entity. The sweep management system generates a shared webpage element and callback functions, which are generated using the first collection and accessible using a second collection of display routines. A graphical representation of one or more of the entities may be generated, for display at the webpage on the client device, using the second collection and the shared webpage element. The one or more entities may be organized within the graphical representation according to a hierarchy. A user may perform a first user interaction with a list entry in the displayed list (e.g., dragging the list entry from the list), where the list entry is representative of a selected entity. In response to determining, using a first callback function of the generated callback functions, that the first user interaction has occurred, the sweep management system may record a data value of the selected entity at the time that the first user interaction occurred. A user may perform a second user interaction with the displayed graphical representation (e.g., dropping the dragged list entry into the graphical representation). Further in response to determining the first user interaction occurred, the sweep management system may update the GUI in response to determining that the second user interaction occurred using a second callback function of the generated callback functions. In particular, the system may generate, for display at the webpage on the client device, an updated graphical representation of the one or more entities using the second collection. This updated graphical representation may include the recorded data value of the selected entity.

In one example, a first user interaction includes a drag of the list entry from a first location on the webpage and the second user interaction includes a drop of the list entry at a second location on the webpage. The callback functions can include event listeners for detecting user interactions with the webpage. The event listeners may include a drag-enter listener, a drag-over listener, and a drop listener. In some embodiments, the list of entities is divided into sections, where each section is associated with a respective entity and a respective drag-enter listener. The first callback function may include a drag-enter listener, and determining that the user has interacted with the list entry may involve determining, using the drag-enter listener, that the user has clicked the list entry.

In some embodiments, the graphical representation includes graphical nodes each associated with a respective entity and a respective webpage location eligible for a drop event. In response to determining that the first user interaction with the list entry has occurred, the sweep management system may further determine, using a drag-over listener, a nearest graphical node of the graphical representation. This nearest graphical node may represent a target entity of the entities (e.g., the target entity with which the user wants to establish a sweep). To determine the nearest graphical node, the sweep management system may determine a current webpage location of the list entry with which the user has interacted and determine that the current webpage location is within a boundary of the nearest graphical node. A drag-over listener may be used to determine the current webpage location of the list entry (e.g., a location in the graphical representation over which the user is hovering the list entry). Each of the graphical nodes may be associated with respective boundaries between other graphical nodes within the graphical representation. For example, the graphical representation is divided into sections by boundaries, where each section includes a node surrounded by some boundaries.

The second callback function may be a drop listener, and determining that the second user interaction with the graphical representation may involve using the drop listener to determine that the user has released the list entry at a webpage location of the graphical representation (e.g., somewhere within the graphical representation on the webpage). The updated graphical representation may be generated by, in response to verifying the webpage location is a valid location to release the list entry, determining an identifier of a nearest graphical node in the graphical representation to which the list entry is released and verifying a relationship exists between the selected entity of the list entry and a target entity of the nearest graphical node. The identifier of the nearest graphical node may be determined using the webpage location at which the list entry is released. The relationship may be verified using an identifier of the nearest graphical node.

The callback functions may include a zoom callback function. In some embodiments, the sweep management system receives a third user interaction with the graphical representation. The third user interaction may be indicative of a request to adjust a size of a graphical node of the graphical representation. The callback functions may include an animate callback function, which may be used to generate an animation of content transferred between two graphical nodes within the graphical representation. The callback functions may include a node-click callback function. In some embodiments, a third user interaction is received which includes a click of a given graphical node. The system may distinguish, using the node-click callback function, a given list entry within the list from other list entries, where the given list entry and the given graphical node are representative of the same entity.

The callback functions may include a move-node callback function. The sweep management system may receive a third user interaction with the graphical representation, where the third user interaction is representative of a request to move a given graphical node to a webpage location associated with a target graphical node of the graphical representation. The given graphical node is representative of a given entity and the target graphical node is representative of a target entity. A relationship between the given and target entities may be verified using the move-node callback function. In response to the relationship being unverified (e.g., the relationship could not be verified or was an invalid relationship), the system may display the given graphical node at the first webpage location to indicate that the requested move has been rejected. In response to the relationship being verified, the system may display the given graphical node at the second webpage location to indicate that the requested move has been accepted.

Examples of entities may include one or more of a financial account for a bank, a profile of an individual in an organization, or a process in a manufacturing facility. The first and second collection of display routines may be two of many collections used to generate the webpage, where each collection is configured to manage webpage elements within a representation of the webpage. The representation of the webpage may be a document object model (DOM). The first collection and second collection may be different JavaScript® libraries. The shared webpage element may be a scalable vector graphic (SVG) object.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 2 depicts a graphical user interface (GUI) for defining a sweep, according to one embodiment.

FIG. 3 depicts a GUI for summarizing a user-defined sweep, according to one embodiment.

FIGS. 4A-C depict a user interaction with a GUI for simulating user-defined sweeps, according to one embodiment.

DETAILED DESCRIPTION

Figure 1:
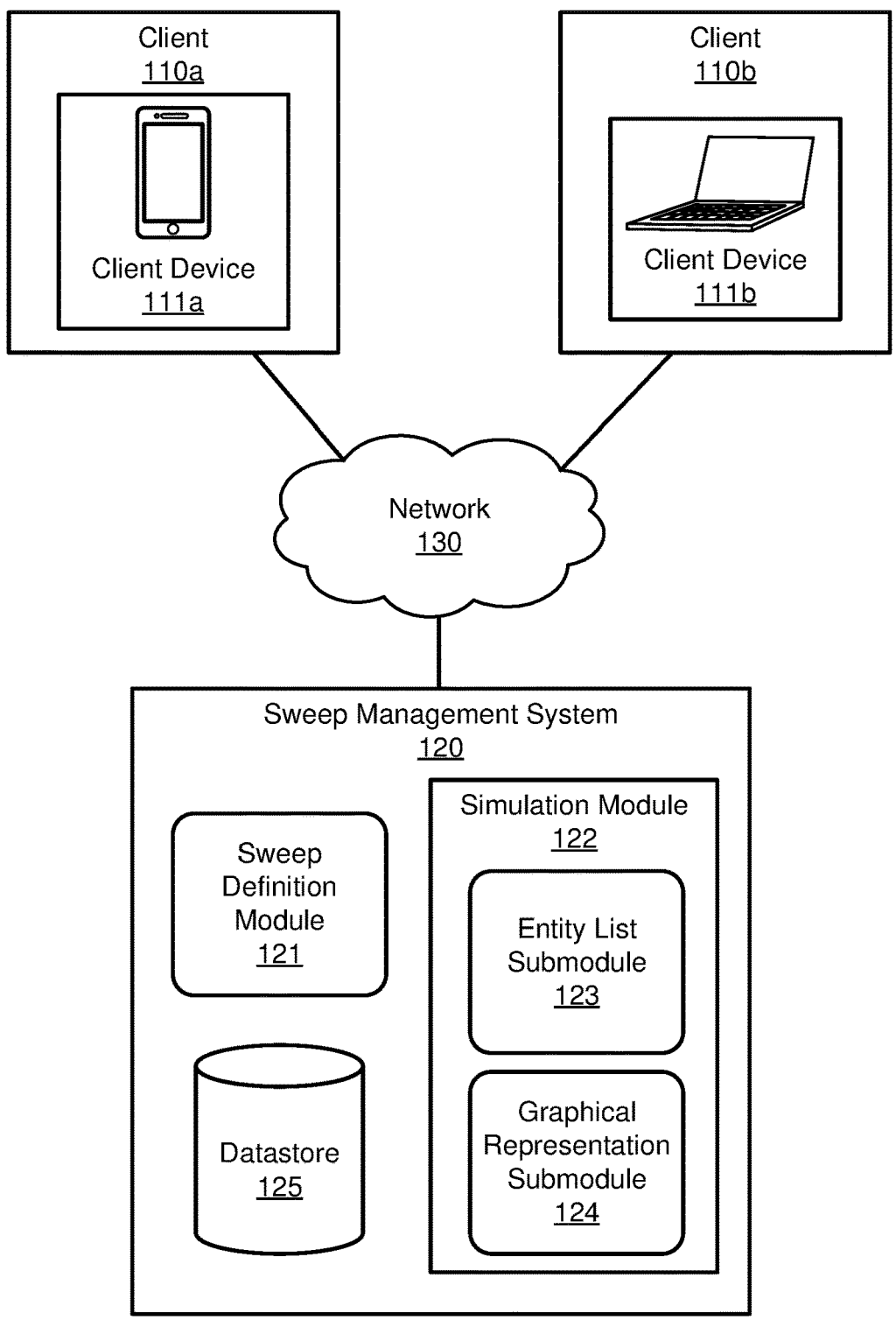
FIG. 1 illustrates a networked computing environment suitable for providing self-service automated sweeps, according to one embodiment.

The Figures and the following description describe certain embodiments by way of illustration only. One skilled in the art will readily recognize from the following description that alternative embodiments of the systems and methods may be employed without departing from the principles described.
System Overview FIG. 1 illustrates one embodiment of a networked computing environment 100 suitable for providing self-service automated sweeps. In the embodiment shown, the networked computing environment 100 includes client devices 111a and 111b (corresponding to clients 110a and 110b, respectively), a sweep management system 120, and a network 130. In other embodiments, the networked computing environment 100 contains different or additional elements. In addition, the functions may be distributed among the elements in a different manner than described. For example, the sweep definition module 121 of the sweep management system 120 may be hosted and executed at the client device 111a or 111b to define a sweep. The simulation of the defined sweep may then occur at the simulation module 122 of the sweep management system 120 that is hosted and executed at a remote server.

A self-service sweep management system generates a graphical user interface (GUI) that enables a user to setup, or define, a sweep and simulate the performance of the sweep. A "sweep" is a type of transfer of assets from one entity to another. An "asset" may be any transferable asset such as data, commodities, money, purchasable products, people, tools, licenses, or any suitable transferrable matter. An "entity" may be a unit of which an organization is composed. For example, a bank account may be an entity of a bank, a classroom may be an entity of a school, an employee may be an entity of a company, etc. Definitions provided are generally applicable unless specified otherwise by the context in which the defined term is used. For example, in the context of a banking client, a sweep may refer to the transfer of money from a sweep account (e.g., to a bank account of a parent corporation). Although references are made herein to the setup and simulation of sweeps, the systems and methods described herein may be applied to the setup and simulation of other types of asset transfers (e.g., covers). The terms "simulation" and "visualization" may be used interchangeably.

The sweep management system provides data for display to a user in a GUI on a client device for managing (e.g., setting up or simulating) sweeps. In one embodiment, the user interface includes a list of entities for which the user has authorization to manage sweeps. Each entity in the list may be represented by a UI element (e.g., a card for each entry in the list) that includes information about the entity. For example, for a bank account entity, the information may include an account number, name, current balance, notes, etc. To setup a sweep, the user may drag and drop two cards into a sweep definition area and then enter parameters for the sweep between the entities (e.g., the bank accounts). For example, the parameters may include a desired balance of one or both bank accounts, whether the sweep is one-way or two-way, a floor and ceiling to define a region in which special behaviors can be defined, etc. Additional sweeps can be defined by dragging additional cards and dropping them over a connector icon for one of the cards already in the see definition area (e.g., a plus sign in a circle connected to the card by a line) and then defining the properties for the new sweep. Thus, the user can build arbitrarily complex hierarchies of sweeps.

One specific use case with two-way sweeps enables assets in an account to be used for short term investments to generate additional revenue. For example, at the end of the business day, a sweep may move all (or most) of the assets in a business's operating expenses account into a short-term investment account and then move the assets back to the operating account in time for the start of the next business day. Any interest earned by the invested assets may also be moved to the operating account, be left in the investment account, or moved to a third account. Another specific use case is to move cash to "follow the sun." As the business day comes to a close in one time zone, cash in accounts dedicated for use in that time zone may be moved to accounts in other time zones where the business day is on-going. This may be done multiple times throughout the day, with the cash ultimately ending up back in accounts in the first time zone for the start of the next business day. Having cash follow the sun in this way reduces the amount of time cash spends in accounts where it will not be used, which may reduce the total cash balance an entity needs to maintain.

The clients 110a and 110b are organizations using the sweep management system 120 to setup or simulate periodic transfer of assets among its entities. Example clients include an internet retailer, a small business, a bureaucratic agency, an engineering company, an educational institution, a consulting firm, a manufacturing facility, a healthcare provider, a bank, any suitable organization having assets that may be transferred to or from the organization's entities, or a combination thereof. In one example, the client 110a or 110b is a bank with entities of banking accounts and assets of cash. In another example, the client 110a or 110b is a manufacturing facility with entities of processes and assets of tools. In yet another example, the client 110a or 110b is an government agency with entities of staff profiles and assets of work product from the staff's assigned tasks. The clients 110a and 110b may have access to a local version of the sweep management system described herein or access the sweep management system 120 located at a remote server, as depicted in FIG. 1, to manage self-service automated sweeps. For the purposes of providing a consistent example throughout the description, the clients 110a and 110b are banks; however, the sweep management system described herein may provide GUIs for self-automated sweeps for other types of clients.

The client devices 111a and 111b are computing devices associated with clients 110a and 110b, respectively, with which users can access the user interface to setup or simulate sweeps. A client device may be a conventional computer system, such as a desktop or a laptop computer. Alternatively, a client device may be a device having computer functionality, such as a personal digital assistant (PDA), a mobile telephone, a smartphone, or another suitable device. The client devices 111a and 111b are configured to communicate with the sweep management system 120 via the network 130, for example using a native application executed by the client devices 111a and 111b (e.g., an application providing functionality of the sweep management system 120) or through an application programming interface (API) running on a native operating system of the computing device, such as IOS® or ANDROID™. In one embodiment, a client device executes software that provides the user interface for a self-service sweep tool and communicates information inputted by the user to the sweep management system 120. Although only two client devices 111a and 111b are shown in FIG. 1, the networked computing environment 100 can include any number of client devices at any given time.

The sweep management system 120 generates a GUI for setting up or simulating sweeps. In the embodiment shown, the sweep management system 120 includes a sweep definition module 121, a simulation module 122, and a datastore 125. In other embodiments, the sweep management system 120 contains different or additional elements. In addition, the functions may be distributed among the elements in a different manner than described. The sweep management system 120 may provide the user interface for display at a web browser hosted application on the client device 111a or 111b. Although the user interface may be referred to herein as a webpage, the user interface may reside on any suitable application for displaying sweep simulations in addition to or alternatively to a web browser hosted application.

The user interface may be rendered at the client device 111a or 111b using a programming language for front-end web development (e.g., JavaScript®, CSS, HTML, etc.). In some embodiments, functions or routines in these programming languages for front-end web development, which will be referred to herein as "display routines," are organized into a collection (e.g., a JavaScript® library) such as D3.js ("D3") or React.js ("React"). Multiple collections may be used to render the webpage, where each collection manages elements within a document object model (DOM). The sweep management system 120 enables these collections, that may lack existing infrastructure to perform an operation together, to render the same webpage by establishing a shared reference (e.g., a shared element within the DOM) that enables the operation to be performed. For example, D3 and React may not be individually configured to allow a user to perform an operation that begins in a portion of the webpage rendered by React and ends in a portion rendered by D3, or vice versa. The sweep management system 120 may create a shared webpage element such as a scalable vector graphic (SVG) object that enables user interactions across respective portions of the webpage rendered by D3 and React.

The sweep definition module 121 may generate a user interface to receive information provided by users for defining a sweep. The sweep definition module 121 may then implement the sweep according to the user's information. In one embodiment, a request for a sweep includes a source entity identifier, a destination entity identifier, and a set of parameters. The set of parameters may include a target asset balance or balance range, floor, ceiling, whether the sweep is one-way or two-way, a time at which the sweep is to occur, a frequency at which the sweep is to occur, any suitable constraint for transferring assets, or a combination thereof. The sweep definition module 121 obtains information about the source and target entities (e.g., any limitations on asset transfers for those entities, costs associated with transfers, etc.) and defines a set of rules that represent the sweep based on the entity information and the sweep parameters. Example user interfaces generated by the sweep definition module 121 are described in the descriptions of FIGS. 2 and 3.

The sweep definition module 121 may perform one or more checks to ensure the sweep is valid. Checks may include verifying required parameters for a sweep are provided or verifying that the requested sweep meets regulatory requirements, if any. For example, for a sweep between bank accounts, the sweep definition module 121 may perform a check to ensure that the requested sweep meets requirements provided by financial institution. If human authorization is not required, the sweep definition module 121 may send instructions to an authority at the client requesting the sweep or a third-party that can authorize the requested sweep. For example, for a sweep between bank accounts, the sweep definition module 121 may send instructions to a transaction orchestration system (or systems) of the financial institution (or institutions) with which the source and target entities (bank accounts) are held to implement the sweep. Alternatively, the sweep definition module 121 may send a notification to the client device 111a of an agent of the client 110a for authorization. The notification may include a link that enables the agent to access a user interface with information about the sweep and approve or deny the request. If a requested sweep is denied, the agent may be presented with a user interface to provide a reason. This may generate a notification back to the requesting user and give them an opportunity to remedy the issue that led to the denial.

The simulation module 122 provides a user interface with which users my visualize the impact of all of the sweeps they have defined. This may be particularly useful with complex hierarchies of sweeps to enable users to ensure the set of sweeps behaves as intended when implemented. For example, the entities may be represented by nodes in a tree structure representing the hierarchy with edges joining the nodes representing the sweeps. The terms "node" and "graphical node" may be used interchangeably. The initial and final balance (pre and post sweep) of assets of each node (entity) may be displayed within the node and an amount of assets (e.g., money) transferred by each sweep displayed next to the corresponding edges. An arrow, color coding, or other visual indicia may be used to represent the direction the money is moving. In some embodiments, the visualization may be animated (e.g., with chevrons moving along the edges indicating the direction of money transfer and the rate of motion indicating the amount).

The simulation module 122 includes submodules for providing the visualization and simulation user interface. In the embodiment shown, the simulation module 122 includes an entity list submodule 123 and a graphical representation submodule 124. In other embodiments, the simulation module 122 contains different or additional elements. For example, the simulation module 122 may contain an error submodule for determining an error has occurred in a user's sweep simulation and notifying a user of this error. For example, the simulation module 122 simulates a sweep according to user-defined parameters and the error submodule may determine that a source entity assigned to cover a target entity has insufficient assets to cover the target entity. The error submodule may generate a notification on the user interface prompting the user to adjust their sweep definitions to prevent the error from occurring again. The simulation module 122 may contain an export submodule for generating a printable or exportable version of the visualization. For example, the export submodule may generate a panel on a user interface for a user to select display options for printing or exporting (e.g., to a particular file format) the graphical representation generated by the graphical representation submodule 124. In addition, the functions may be distributed among the elements in a different manner than described.

The simulation module 122 may simulate different types of asset transfers or directions thereof. Different types of asset transfers may include a sweep for a destination entity, where assets are transferred from one or more source entities to the destination entity, or a cover for the destination entity, where assets are transferred from a destination entities to a source entity if the source entity's asset inventory has dropped below a threshold amount. In one example of simulating a cover, the simulation module 122 determines that funds within a source entity of a bank account has dropped below $0 and based on a user-defined cover, the simulation module 122 determines to transfer money from a destination entity into the source entity. In some embodiments, the simulation module 122 may simulate different directions in which the different types of asset transfers can occur such as forward or reverse transfers. For example, in a forward sweep, the simulation module 122 simulates the transfer of money from a source bank account entity to a target bank account (e.g., as defined in a user's requested sweep). A forward sweep may be the default direction of sweep that is simulated by the simulation module 122. In an example of a reverse sweep, the simulation module 122 simulates the transfer of money from a target bank account to a source bank account.

The simulation module 122 may provide a user interface having various components such as a graphical representation (e.g., a hierarchical organization) of entities within a sweep simulation or a list of entities available for the sweep simulation. The simulation module 122 may use different collections of display routines for rendering the various components. The graphical representation may be rendered using one collection (e.g., the D3 library) and the list may be rendered using another collection (e.g., the React library). The simulation module 122 enables the users to make interactions between components of the user interface. For example, a user may use a touch screen of the client device 111*a* to drag a list entry representative of an entity in the list component (rendered by React) over to the graphical representation (rendered by D3) to add an account for which assets will be transferred in a sweep. An example of a user interaction for dragging and dropping between user interface components is described in the descriptions of FIGS. 4A-4C.

In some embodiments, the simulation module 122 may render more portions of a user interface (e.g., a webpage) using a given collection of display routines than other collections. That is, the overall webpage may be rendered by the given collection. This collection may maintain entity data or sweep definition data. The other collections rendering some portions of the webpage may communicate (e.g., using callback functions provided between collections) with the given collection to verify entity information or sweep validity. For example, a webpage may be rendered overall by React and include a graphical representation of entities (e.g., a hierarchical chart of the entities) rendered by D3. User interactions with the graphical representation may cause the simulation module 122 to invoke a callback function, using D3, to verify, using React, that the user interactions are valid (e.g., a requested move of an entity in a sweep configuration is valid).

The simulation module 122 may use multiple collections of display routines to render a user interface, where each collection manipulates a representation of the user interface. For example, the simulation module 122 may use multiple JavaScript® libraries that each manipulate a DOM of the webpage. Each collection can manipulate the representation by adding, removing, or editing elements of the representation, where the user interface is composed of the elements. Elements of a DOM can include a title, audio, an image, an object, a video, text, a hyperlink, etc. In some embodiments, a collection may create and add a shared webpage element or callback functions to the DOM that is accessible by other collections that manipulate the DOM. The shared webpage element may be accessible to other collections using an identifier (ID) associated with the shared webpage element upon creation. For example, the simulation module 122, through React, may create and add an SVG object and various callback functions to the DOM that are accessible through D3, where the SVG object has an ID for D3 to identify the SVG object as the shared webpage element. The simulation module may use the SVG object's ID to enable various collections of display routines to access the SVG object (e.g., to generate a graphical representation on the SVG object using D3). Further, the simulation module 122, through D3, may take React components props, including callback functions, upon the execution of a D3 function that is called when the simulation module 122 uses React to mount the shared SVG object to the DOM.

In some embodiments, the callback functions added to the DOM by the simulation module 122, via a collection, may include event listeners for detecting user interactions within the user interface. The simulation module 122 may attach event handlers to particular elements within the DOM. In one example, callback functions added to the DOM by React may include event listeners such as a drag-enter listener, a drag-over listener, or a drop listener for detecting corresponding user interactions with a webpage. A drag-enter listener may detect a user's interaction beginning a drag operation. An example interaction may be a user's selection of a list entry in a list maintained by the simulation module 122 using React. A drag-over listener may detect a user's interaction during a drag operation. An example interaction may be a user's moving the selected list entry across the webpage by holding their finger against the touchscreen display and moving the finger across the display. A drop listener may detect a user's release of the selected list entry near or at a desired destination in the webpage (e.g., the graphical representation rendered by D3). An example interaction may be a user's lift of their finger from the touchscreen display. To include these event listeners, the simulation module 122 may attach event handlers to the elements within a representation of a webpage (e.g., the DOM) corresponding to portions of the webpage at which the user interactions (e.g., drag and drop) will occur. In one example, event handlers for the drag-enter listeners may be attached to an element added by the simulation module 122, through React, for the list of entities (e.g., one event handler per list entry in the list).

Figure 4A:
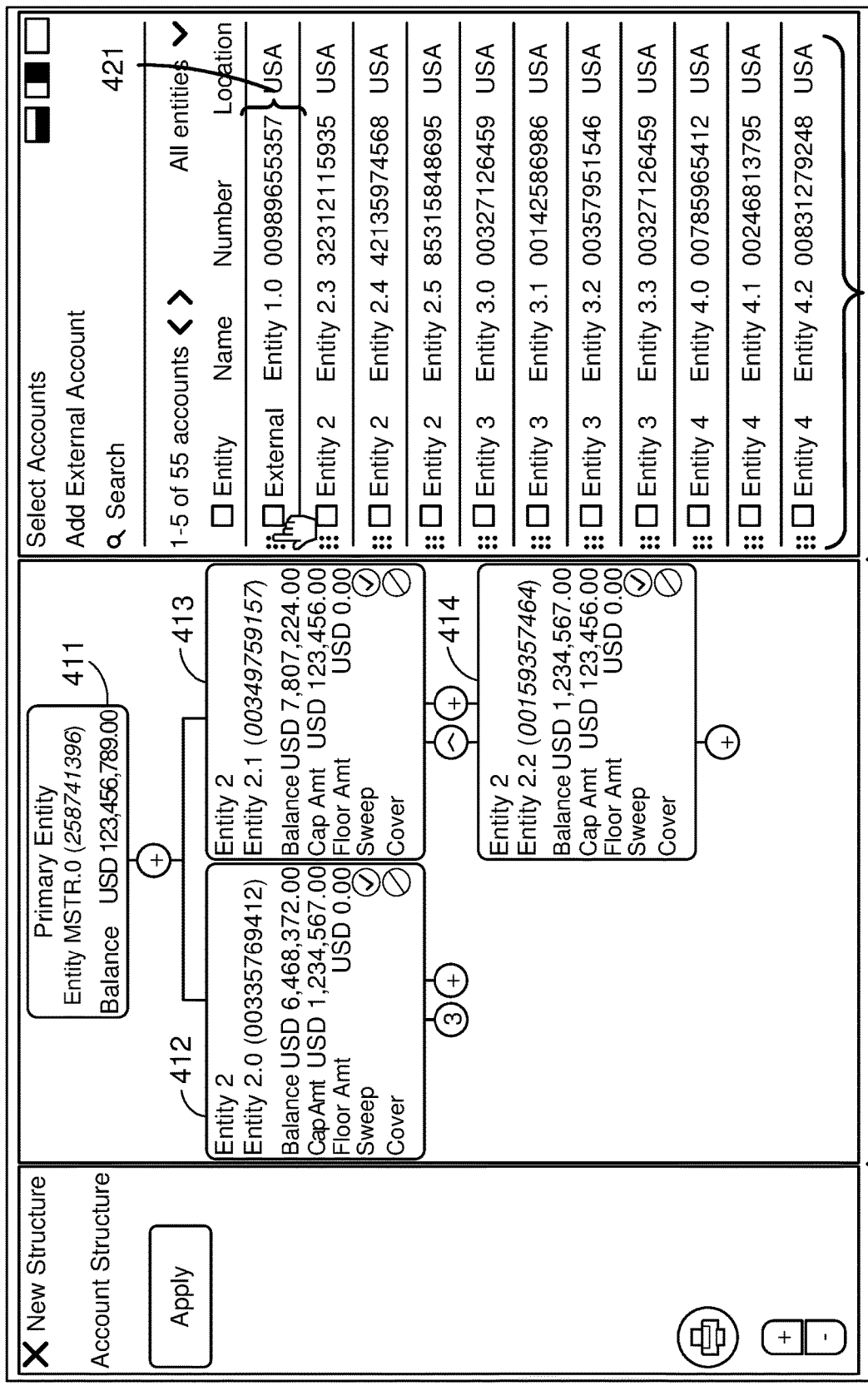
Figure 4B:
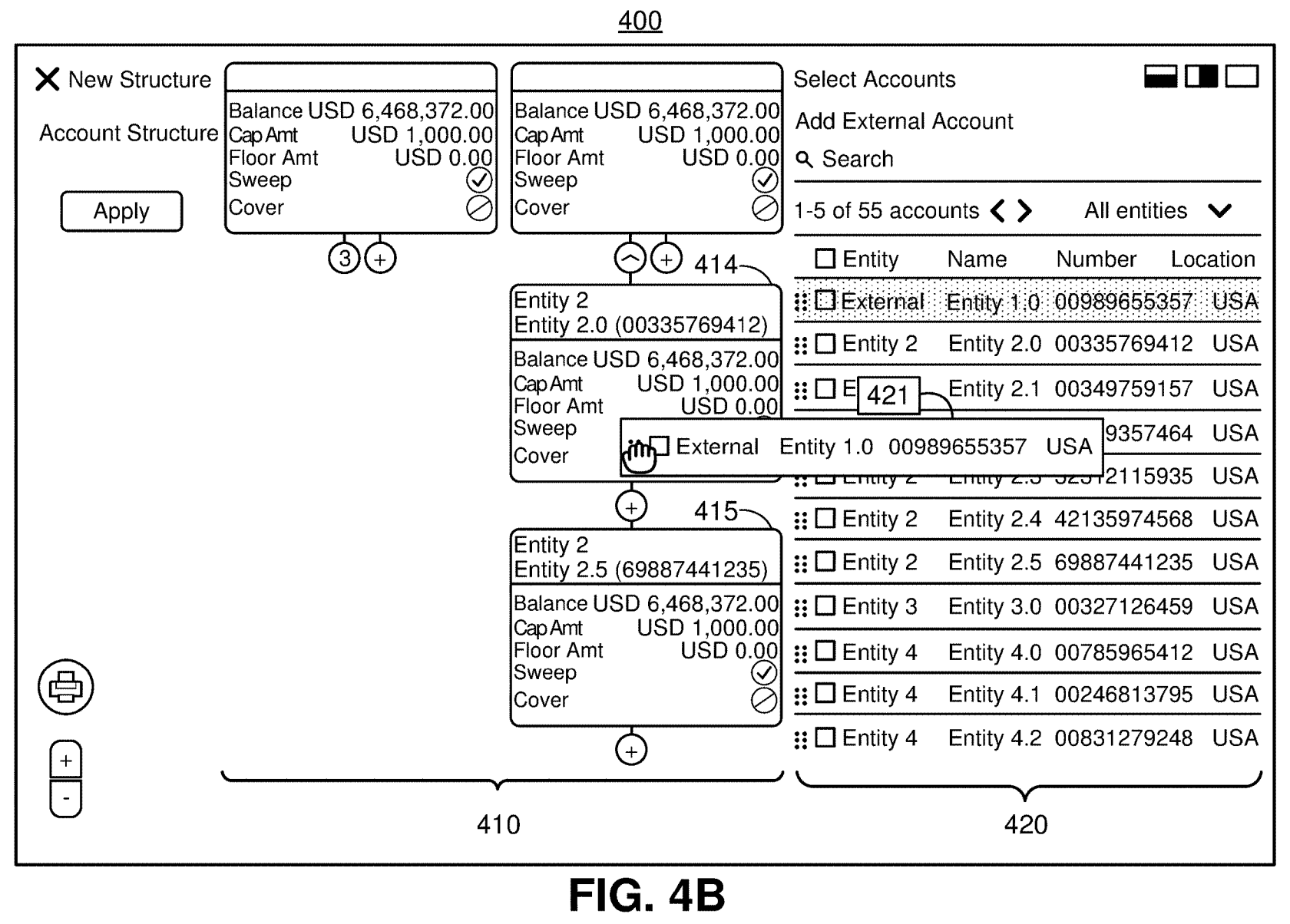

The entity list submodule 123 generates a list of a client's entities for display at a user interface. Entries within the list, or "list entries," may be generated, for display, for each entity and include information related to the entity such as the entity's name, a user-specified name for the entity, an ID number, a location of the entity, any suitable descriptor of the entity, or a combination thereof. For example, for a client in the restaurant industry, entries within the list generated by the entity list submodule 123 may correspond to restaurants' bank accounts. A first entry may include the name of the entity, "Pizza House," a user-defined name of the entity "PH-001," a bank account number, "01223334444," and a location of the entity, "USA." A second entry may include the name of the entity, "Pizza House," a user-defined name of the entity "PH-002," a bank account number, "11111100101," and a location of the entity, "USA." An example of a generated list is shown in FIGS. 4A-C.

The entity list submodule 123 may generate an interactive list. The entity list submodule 123 may receive an indication (e.g., through an event listener) that a user has interacted with the list displayed at the user interface and in response, the entity list submodule 123 may update the user interface based on the received interaction. The entity list submodule 123 may update the user interface by highlighting an entry in the list, expanding an entry in the list to show additional information about the corresponding entity, "lifting" the entry out of the list (i.e., causing the entry to appear as if the user has lifted the entry from the list), or any suitable visual modification to distinguish the appearance of an entry from other entries. The entity list submodule 123 may additionally or alternatively respond to user interactions with the generated list through an audio response (e.g., a sound output through a speaker of the client device 111*a*) or a haptic response (e.g., vibrating the client device 111*a*).

In some embodiments, the entity list submodule 123 generates the interactive list using a collection of display routines (e.g., React). The entity list submodule 123 may divide the list of entities into sections (e.g., entries), each section associated with an entity and a respective drag-enter listener. For example, the list is divided into an entry for entity "PH-001" and an entry for "PH-002," where the DOM for the webpage in which the list resides includes respective elements for the list, list entries, and drag-enter listener attached to each list entry. In some embodiments, a callback function that is shared by a collection rendering the webpage includes an event listener such as the drag-enter listener. The entity list submodule 123 may determine that the user has interacted with a list entry by using a drag-enter listener of a corresponding list entry to which it is attached. For example, the entity list submodule 123 may determine that the user has selected "PH-002" for over a threshold time using the drag-enter listener, where the threshold time corresponds to a duration of time that a user holds the entry, as opposed to a tap or click on the entry without intending to drag the entry somewhere on the webpage.

The graphical representation submodule 124 generates a graphical representation of entities within a user-defined sweep for display at a user interface. The graphical representation may be a hierarchical chart of the entities within a sweep. The entities within the hierarchical chart may be organized as "nodes" that are connected to one another according to a sweep's defined destination and source entities (e.g., an arrow drawn between a destination entity node and a source entity node). The graphical representation submodule 124 may use a collection of display routines (e.g., D3) to generate the graphical representation.

In some embodiments, the graphical representation submodule 124 interacts with the entity list submodule 123 to enable a user to perform an operation starting from a portion of the user interface rendered by one module and ending at a portion rendered by the other module. Although the graphical representation submodule 124 and the list entity submodule 123 may rely on different collections of display routines to generate their respective portions of the user interface, the modules may enable such an operation by sharing web elements within a DOM that both collections manipulate. For example, the graphical representation submodule 124, using D3, executes a D3 function that is called from a React function (e.g., the componentDidMount life cycle function). The executed D3 function may take all React components props, including callback functions, and a shared web element (e.g., an SVG object) added to the DOM by React. Callback functions shared by one collection (e.g., React) to another collection (e.g., D3) may allow the functions running within the other collection to communicate back to the first collection. An example of code creating and referencing a shared SVG object with an ID is shown in Table 1.

TABLE 1

Example Code to Create a Shared Web Element

```
componentDidMount( ) {
  drawChartFunction(this.props, "svgContainerId");
}
render( ) {
  return <svg id={"svgContainerId"} />;
}
const svg = d3.select("#svgContainerId")
```

In one example, the graphical representation submodule 124 interacts with the entity list submodule 123 to enable a user to perform a drag and drop operation starting from the entity list and ending at the graphical representation. The entity list submodule 123 may determine, using a drag-enter listener, that a user interaction has occurred that includes the drag of a list entry from a first location on the webpage (e.g., from the entity list rendered by the entity list submodule 123). The graphical representation submodule 124 may determine, using a drag-over listener or a drop listener, that a subsequent user interaction has occurred that includes the drop of the dragged list entry at a second location on the webpage (e.g., at the graphical representation). In some embodiments, the graphical representation submodule 124 takes a callback function shared by the entity list submodule 123, where the callback function is a drop listener. The graphical representation submodule 124 may determine, using the drop listener, that the user has "dropped" (e.g., released a cursor or released pressure from a touchscreen) an list entry at a webpage location of the graphical representation (e.g., between two nodes in the hierarchical chart).

The graphical representation submodule 124 may enable a user to perform a drag and drop operation within the graphical representation. For example, the graphical representation submodule 124 generates the graphical representation of entity nodes in a hierarchical organization and enables the user to drag and drop a node from one position within the hierarchy to another. The graphical representation submodule 124 may add web elements to a DOM, the web elements corresponding to respective entity nodes within the graphical representation, and use event listeners to determine that a user has interacted with the entity nodes. For example, the graphical representation submodule 124 may generate a web element for each node within the graphical representation and attach a drag-enter or drag-over listener to each node. Using the event listeners, the graphical representation submodule 124 determines that a user interaction has occurred with the graphical representation indicative of a request to move a selected node from its location within the graphical representation.

The graphical representation submodule 124 may use a drop listener to determine that a user interaction indicative of a drop has occurred and where the drop is on the webpage (e.g., a location within the graphical representation). The graphical representation submodule 124 may use the location of the drop to determine a target node to which the user has requested to move the dragged node. The nearest, existing node next to which a user requests to move or create a node may be referred to herein as a "target node" and the corresponding entity that the target node represents may be referred to herein as a "target entity." By default, when the graphical representation is organized in a hierarchy, the graphical representation submodule 124 may determine to display the dragged node immediately below the target node when the user drops the dragged node.

For a drop operation, regardless of whether the source is from within the graphical representation or external (e.g., from the entity list), the graphical representation submodule 124 may determine the node nearest to the location at which the user has dropped a selected node or list entry. The graphical representation submodule 124 may determine, using a drag-over listener, that a user interaction is occurring or has occurred (e.g., movement of a selected UI element, such as a node or list entry, over the portion of the webpage where the graphical representation is located) that prompts the execution of a function including a drop listener. The graphical representation submodule 124 may use the drag-over listener to determine, while the user is dragging the UI element, a nearest node. For example, the graphical representation submodule 124 may determine, per pixel of movement or per fraction of a second over which the user moves the UI element, the nearest node to a pixel on the interface that the dragged element is currently located.

The graphical representation submodule 124 may divide the graphical representation into sections for each of the entity nodes, where each section has a boundary between it and other sections. For example, the graphical representation submodule 124 may determine the coordinates of entity nodes within the representation and create a Voronoi context using the coordinates. In some embodiments, the graphical representation submodule 124 may generate the boundaries for display at the user interface as the user is moving a UI element over the graphical representation. The graphical representation submodule 124 may determine, using the drag-over listener, a current section of the graphical representation over which the user is currently dragging the UI element.

Figure 7:
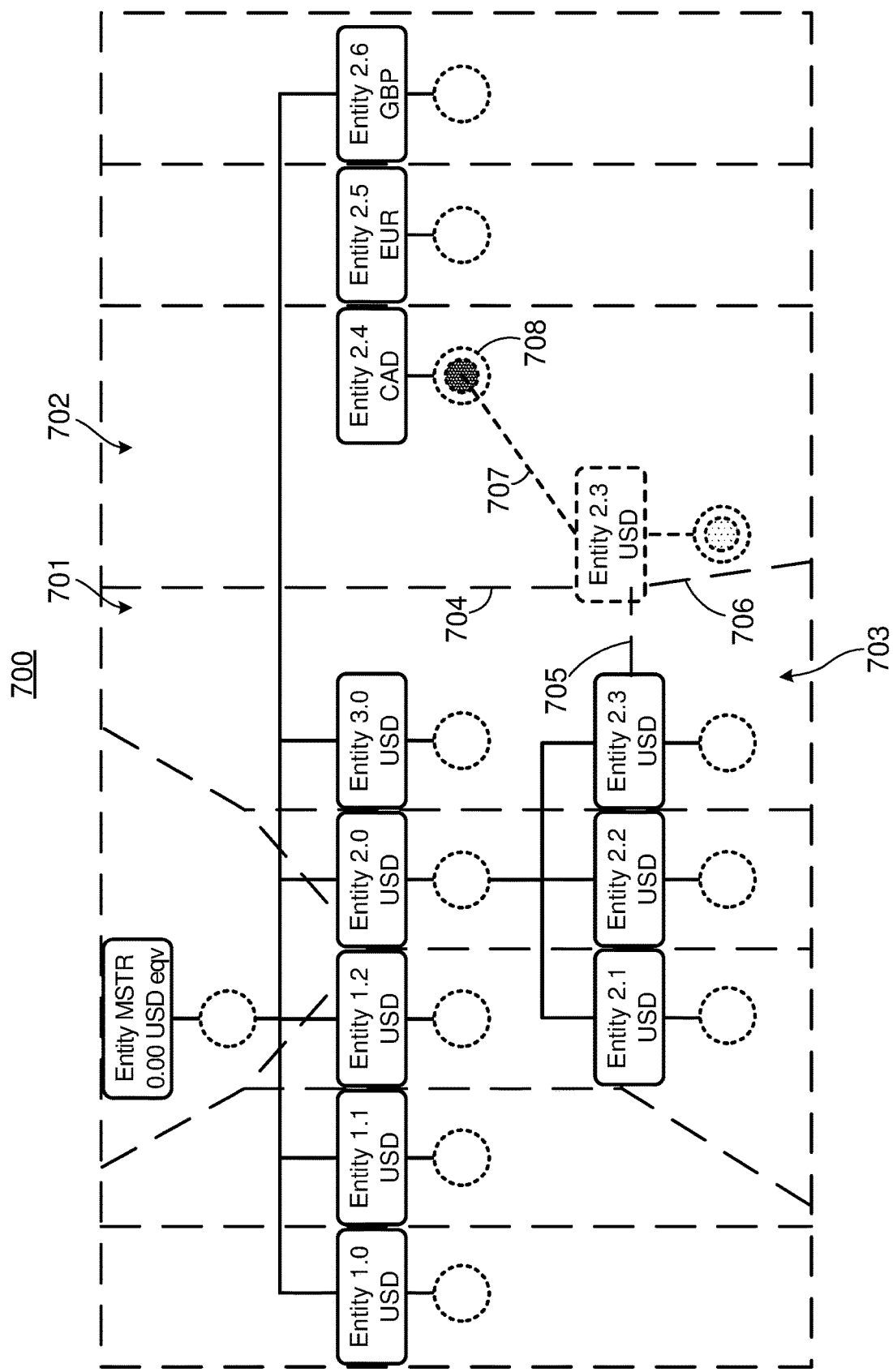
FIG. 7 depicts a representation of a divided graphical representation for simulating sweeps, according to one embodiment.

In some embodiments, the graphical representation submodule 124 determines, as the user is dragging the UI element, a nearest node using the Voronoi "find" function. The graphical representation submodule 124 may display the nearest node on the user interface as graphically distinguished from other nodes. For example, the nearest node may be highlighted while others are not or a line may be drawn between the user's dragged UI element and the nearest node. The graphical distinction may be removed from display once the user has dropped the UI element. The graphical representation submodule 124 may determine, based on a location within the user interface determined using the drop listener, a section into which the user dropped the UI element. In some embodiments, if the current location of drag-over or drop is on a shared boundary of sections, the graphical representation submodule 124 may determine one of the nodes of the shared boundary by random or select the node whose boundaries the user had been within prior to contacting the shared boundary. An example of a graphical representation divided into sections is shown in FIG. 7.

The graphical representation submodule 124 may, for the sections of the graphical representation that a user is dragging or dropping a UI element over, verify that the corresponding entities of the sections can be connected to the dragged UI element's entity for a sweep. That is, the graphical representation submodule 124 may verify that the location that the UI element is being dragged within the graphical representation is a location eligible for a drop event. The graphical representation submodule 124 may verify whether a user requested drop of a selected entity within the graphical representation is appropriate depending on entity information or sweep definitions. For example, the client 110a provides information about the bank account entities such as which bank accounts are authorized to send or receive funds from certain bank accounts. Entity information may indicate that entities "PH-001" and "PH-002" may be allowed to transfer funds between one another, but a third entity, "PH-003," may only be allowed to transfer funds between "PH-002," and not "PH-001."

Using entity information or sweep definitions, the graphical representation submodule 124 may accept or deny a user's request to modify the graphical representation. For example, a user's request to insert a node (e.g., via a drop) for "PH-003" that connects to "PH-001" may be denied because the entity definitions do not allow this relationship. The graphical representation submodule 124 may determine, using a drop listener, a webpage location at which the user has requested to drop a selected list entry representative of "PH-003." The graphical representation submodule 124 may then determine a target node and a corresponding identifier of the target node.

Using the identifier, the graphical representation submodule 124 may verify that a relationship exists between the target entity and the selected entity represented by a node or list entry the user is requesting to insert (e.g., drop) or move in the graphical representation. For example, the graphical representation submodule 124 determines an identifier for the node representative of "PH-001" and executes a callback function, "move-node," with the entity list submodule 123 to verify that "PH-003" can be connected to "PH-001" in the graphical representation. The move-node callback function may be executed with the identifier as an argument of the function. In some embodiments, the functions of the move-node callback function may be included in or equivalent to the functions of the drag-over listener.

The entity list submodule 123 may maintain the entity information and verify, upon the execution of the move-node callback function and using the provided identifier, that there is no proper sweep relationship between "PH-001" and "PH-003." In response to the relationship being unverified or verifying that no relationship can exist, the graphical representation submodule 124 may maintain the current graphical representation (i.e., without an update to reflect the user's requested move). In an example where the user requested to move a node within the graphical representation, the graphical representation submodule 124 may display the selected node at its original location after a user has dropped the node to indicate that the requested move has been rejected. In an example where the user requested to move a list entry from the entity list over to the graphical representation to add a new node to the representation, the graphical representation submodule 124 may maintain the display of the representation in response to the user dropping the node to indicate that the requested insertion has been rejected.

If the entity list submodule 123 verifies that a proper sweep relationship can exist between the nodes that the user is requesting to connect, the entity list submodule 123 may modify one or more existing sweep definitions to reflect the newly requested sweep definitions between entities. Further, the graphical representation submodule 124 may display the nodes according to the requested relationship. For example, the graphical representation submodule 124 may display the entry list's entity as a corresponding node connected to (e.g., for a hierarchical organization, beneath) the target node or display the existing node within the graphical representation in its new location connected to the target node.

The graphical representation submodule 124 may cause the display of additional information regarding an entity in response to a user's selection of the corresponding node representing the entity within the graphical representation. The additional information may be displayed at the graphical representation or at the entity list. For example, the graphical representation submodule 124 may determine, using an event listener attached to the element of the DOM corresponding to the graphical representation (e.g., an SVG object), that a user has selected or clicked a node within the graphical representation. The graphical representation submodule 124 may then update the user interface to show more information about the entity within the node. Alternatively or additionally, the graphical representation submodule 124 may communicate with the entity list submodule 123 to cause additional information about the entity to be displayed at the entity list. For example, the graphical representation submodule 124 provides the identifier of the user-selected node to the entity list submodule 123 using a node-click callback function. The identifier of the user-selected node may be an argument of the node-click callback function, which upon execution, causes the entity list submodule 123 (e.g., using React) to render the additional information of the entity of the selected node in the list or in another portion of the user interface. In some embodiments, the entity list submodule 123 renders the additional information in a new window in the user interface that covers the list after the user has clicked a node and may disappear to reveal the list once the user makes a subsequent click or selection within the user interface.

The graphical representation submodule 124 may generate the graphical representation with varying levels of detail. In a first example of a detailed view of the graphical representation, a chart having hierarchical organization of the nodes in a sweep is generated with details of the entities at their corresponding nodes (e.g., entity name, user-specified name, asset balance, ceiling and floor amounts of the asset balance, whether the entity is included in a sweep or cover definition) and an amount of assets being transferred to or from the entity in a simulated sweep. In this detailed view, the graphical representation submodule 124 may display the amount of assets being transferred from adjacent levels and nonadjacent levels. For example, in a three-tiered hierarchical chart with a destination node connected to two source nodes (i.e., one node at the top, two nodes at the second tier, and four nodes at the third tier), the chart is generated with six connectors showing assets transferred to the entity at the top of the hierarchy, the number of arrows corresponding to the number of source entities within the chart whose assets are ultimately transferred to the entity at the top, and not only the number of source entities at the level immediately below the entity at the top (i.e., two sources). In some embodiments, the graphical representation submodule 124 generates a net view of the graphical representation that is less detailed than the detailed view. For example, the graphical representation submodule 124 displays a net view having the details at the entity nodes similar to the detailed view, but in the net view, the display of assets transferred may be simplified by reducing the connectors displayed the hierarchical chart. Using the previous three-tiered hierarchical chart as an example, rather than six connectors displayed as transferring assets to the top entity, two connectors are displayed to indicate assets transferred between the first tier and second tier.

As described previously, the simulation module 122 may use multiple collections of display routines to render a user interface, where each collection can manipulate a representation of the user interface (e.g., manipulate a DOM of a webpage). To integrate potentially disparate collections that are not preconfigured to perform a single operation together (e.g., a drag and drop), one collection may add a shared web element and various callback functions to the DOM that is accessible by another collection. For example, the entity list submodule 123, using React, may add a shared SVG object and callback functions for the graphical representation submodule 124, using D3, to communicate back to the entity list submodule 123 (e.g., a user clicked a node in the graphical representation that causes the entity list to update). Furthermore, the entity list submodule 123 may provide callback functions to the DOM for the entity list submodule 123 to communicate to the graphical representation submodule 124, These callback functions may be referred to as "callforward" functions.

Example callforward functions include zooming functions and animation functions. The entity list submodule 123 may provide a callback function to the graphical representation submodule 124. This provided callback function may take, as an argument, an object which is a set of functions defined in the domain of the collection of display routines used by the graphical representation submodule 124. The graphical representation submodule 124, on initial invocation, may call this callback function (i.e., the callforward function) with references to the functions that the graphical representation submodule 124 is sharing through the DOM. An example is provided below in Table 2.

TABLE 2

Example Code for a Call Forward Function

```
callForward( {
    zoomDetail: functionWhichChangesZoomDetail,
    animateLinks: functionWhichPerformsLinkAnimation
});
```

When the entity list submodule 123, that has generated the shared SVG object that the graphical representation submodule 124 uses to render the graphical representation, receives an indication of a user interaction prompting an update of the graphical representation, the entity list submodule 123 may select an appropriate call forward function and execute it.

The simulation module 122 (i.e., the entity list submodule 123 or the graphical representation submodule 124) may receive a user interaction with the graphical representation, where the user interaction is indicative of a request to adjust a size of a node in the representation. For example, the user may user their fingers on a touchscreen to zoom into the user interface at the graphical representation and the simulation module 122 may use an event listener to determine the interaction has occurred. In response to a zoom-in interaction (e.g., the user increasing a distance between two fingers in contact with a touch screen), the entity list submodule 123 may execute a callforward function that prompts the graphical representation submodule 124 to modify the graphical representation displayed by including more information about an entity displayed in its corresponding node (e.g., a node that the fingers contacted before zooming in) or decreasing the number of nodes displayed at the user interface while increasing the space with which the displayed nodes occupy the graphical representation. Likewise, in response to a zoom-out interaction (e.g., the user decreasing a distance between two fingers in contact with a touch screen), the entity list submodule 123 may execute a callforward function that prompts the graphical representation submodule 124 to modify the graphical representation displayed by including less information about an entity displayed in its corresponding node (e.g., a node that the fingers contact after zooming out) or increasing the number of nodes displayed at the user interface while decreasing the space with which the displayed nodes occupy the graphical representation.

The entity list submodule 123 may communicate with the graphical representation submodule 124 to update the user interface with a modified graphical representation based on a user interaction at the entity list generated by the entity list submodule 123. In some embodiments, the entity list submodule 123 receives a user interaction selecting an entity from the entity list, where the selected entity is also represented as a node in the graphical representation. The user interaction may be detected using an event listener. The entity list submodule 123 may execute a callforward function that prompts the graphical representation submodule 124 to modify the graphical representation. For example, upon a user's selection of a list entry representing an entity, the graphical representation is modified to graphically distinguish the node in the graphical representation or display more information about the entity within the node. In some embodiments, the selected entity is not yet represented as a node in the graphical representation, and upon a user's selection of a list entry, the graphical representation submodule 124 causes available locations for a corresponding node to be placed within the graphical representation to be displayed. The entity list submodule 123 may access entity information and sweep definitions to determine which entities that the entity of the selected list entry may be connected to in a sweep and provide the determined entities to the graphical representation submodule 124 to display available locations in the graphical representation corresponding to the determined entities (e.g., below the nodes of the determined entities in a hierarchical chart).

The graphical representation submodule 124 may generate animations for visualizing the transfer of assets in a sweep at a user interface. In some embodiments, the simulation module 122 receives a user request to animate the transfer of assets occurring within a simulated sweep. For example, the simulation module 122 may provide a button or toggle on the user interface that activates or deactivates the animation effects. One of the callforward functions provided by the entity list submodule 123 to the DOM may be an animation function for generating animations (e.g., moving arrows or chevrons) showing the direction of assets transferred between nodes in the graphical representation.

The simulation module 122 (e.g., the entity list submodule 123 or the graphical representation submodule 124) may add an external entity to the sweep simulation. For example, the entity list submodule 123 may provide a hyperlink that causes the display of a panel having input text fields for the user to specify the identifying information about the external entity (e.g., an account number and routing number of an external bank). The simulation module 122 may confirm that the user-specified information is accurate (e.g., by contacting the external bank). In response to determining the information is accurate, the entity list submodule 123 may generate a new list entry for display at the list of entities, where the new list entry contains the user-specified information about the external entity. If the information was not accurate, the entity list submodule 123 may generate an error notification and maintain the current appearance of the entity list.

The simulation module 122 may determine that an entity requested to be simulated in a sweep is not available. For example, the entity list submodule 123 may provide an input text field enabling the user to search for an entity to add to a sweep. The entity list submodule 123 may use the entity information provided by a client to determine whether the user-specified entity exists. If the entity does not exist, the entity list submodule 123 may return an error notification informing the user that the entity does not exist. If the entity does exist, the entity list submodule 123 may perform further checks on the queried entity to determine if it is available for simulation within the graphical representation (e.g., using existing sweep definitions reflected in the graphical representation). If the queried entity is not available to be simulated in the sweep, the entity list submodule 123 may generate a notification (e.g., display a flag on the user interface) that the queried entity is unavailable for simulation.

The simulation module 122 may generate for display options for adjusting the simulation of a particular entity. For example, the user may interact with a node within the graphical representation. The simulation module 122 may use an event listener to determine this user interaction has occurred. In one example, the simulation module 122 may determine, in response to a user interaction selecting a node, to execute a function prompting the entity list submodule 123 to display options for adjusting the simulation of the entity corresponding to the selected node. The entity list submodule 123 may display options including a toggle for activating or deactivating the sweep for the entity, changing the minimum or maximum amount of assets transferred in the sweep, activating or deactivating a cover for the entity, a target asset balance amount for the entity, any suitable parameter for simulating a sweep, or a combination thereof.

The datastore 125 includes one or more computer readable media configured to store data used by the server 110. For example, the datastore 125 includes a database for storing information related to entities such as a name of the entity, an amount of an asset possessed by the entity, or the presence of a sweep set up for the entity. The datastore 125 may include a database for storing user-defined sweeps to visualize. Although it is shown as a single element, the datastore 125 may be split into multiple parts. Furthermore, although the datastore 125 is shown as part of the sweep management system 120, some or all of the data may be stored remotely (e.g., in a distributed database) and accessed via the network 130.

The network 130 may serve to communicatively couple the client device 111a, the client device 111b, and the sweep management system 120. In some embodiments, the network 160 includes any combination of local area or wide area networks, using wired or wireless communication systems. The network 160 may use standard communications technologies or protocols. For example, the network 160 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 160 may be encrypted using any suitable technique or techniques.

User Interfaces for Self-Service Automated Sweeps

FIG. 2 depicts one embodiment of a graphical user interface (GUI) 200 for defining a sweep. The sweep management system 120 may generate the GUI 200 (e.g., using the sweep definition module 121) at the client device 111a or 111b. Using the GUI 200, the sweep management system 120 receives user input defining a sweep to simulate using the simulation module 122. The user may set up a sweep definition through various user interface inputs included in the GUI 200. In other embodiments, the GUI 200 contains different, additional, or fewer elements.

In the embodiment shown in FIG. 2, the GUI 200 includes an input text field for a user to specify a name for the sweep structure. For example, the user of client device 111a may specify that the name for the sweep structure associated with an account for client 110a, "Restaurant Corporation," be "Restaurant Corporation Payroll Sweep." The GUI 200 includes a drop-down menu for the user to select one or more source entities from which assets will be transferred in the sweep. For example, the user may select the drop-down menu and in response, the sweep definition module 121 displays a list of available source entities available to Restaurant Corporation such as "Pizza House," "Taco Bowl," or "Kathmandu Fried Chicken." Although not depicted, the sweep management system 120 may require the user to select, prior to displaying the GUI 200, a destination entity to which the sweep will transfer assets from user-specified source entities. In some embodiments, the GUI 200 includes an input text field specifying a loan interest rate for the assets transferred from the source to the destination entity. For example, the user may specify that a 1.7% loan interest rate be applied to cash transferred to Restaurant Corporation from Pizza House, Taco Bowl, and Kathmandu Fried Chicken. Source entities that may be specified through the GUI 200 may include external source entities (e.g., entities such as financial institutions that are not owned by Restaurant Corporation but may be a source for cash to Restaurant Corporation).

The GUI 200 may include a drop-down menu for the user to select an asset concentration type. Asset concentration types may include a target type, a range type, or a range based target balance type. These asset concentration types may define conditions under which a sweep should be executed. For example, a target type of asset concentration may be selected to execute sweeps maintain a fixed asset amount at the source entities. A range type of asset concentration may be used to execute a sweep if an asset balance on a source entity is outside of a user-specified range. A range based target balance type may be selected to execute a sweep if an asset balance on a source entity is outside of a range and executed to achieve a specific target amount of the asset. In some embodiments, the asset concentration types may also define conditions under which a cover should be executed. The GUI 200 may include input text fields for specifying a default target asset amount or a range of amounts that a source entity should maintain. The GUI 200 may include a drop-down menu for selecting a setting for balance or limit sharing. Settings may include "no sharing," "balance sharing," "limit sharing," or "balance and limit sharing."

The GUI 200 may include radio buttons for the user to specify whether a sweep should be a one way sweep or two way sweep. A "one way sweep" may be defined as a transfer of assets from a source entity to a destination entity without transferring the assets back to the source. A "two way sweep" may be defined as a transfer of assets from a source entity to a destination entity at a certain time (e.g., at the end of a business day relative to the source entity) and a transfer of the assets back to the source entity at a subsequent time (e.g., at the beginning of the next business day relative to the source entity). The GUI 200 may provide a drop-down menu for the user to specify the times at which a one way sweeps or two way sweeps are to occur. The GUI 200 may provide a drop-down menu for the user to specify a sweep variant for display at the simulation interface. Sweep variants may include a net view, detailed view, or total credit/total debit view. The GUI 200 may provide drop-down menus and radio buttons to specify the frequency at which a sweep is to occur. For example, a sweep to a destination entity account of Restaurant Corporation may occur daily starting on May 8, 2020 and repeating indefinitely (i.e., until a user specifies the sweep should have an end date). The GUI 200 may include a button to add specific source entities to the sweep. For example, the user may select the button and the sweep definition module 121 may generate a user interface for display that includes an input text field, drop-down menu, or any suitable interface element for specifying specific entities (e.g., bank account "PH-001" from which the user specifies cash should be transferred to Restaurant Corporation's bank account).

FIG. 3 depicts one embodiment of a GUI 300 for summarizing a user-defined sweep. The sweep management system 120 may generate the GUI 300 (e.g., using the sweep definition module 121) at the client device 111a or 111b. Using the GUI 300, the sweep management system 120 displays a user-defined sweep to confirm a sweep that has recently been defined (e.g., the GUI 300 may be displayed immediately after displaying GUI 200) or to enable a user to edit a defined sweep (e.g., after simulating the sweep, the user decides to modify the sweep definition). In other embodiments, the GUI 300 contains different, additional, or fewer elements.

In the embodiment shown in FIG. 3, the GUI 300 contains an overview panel for displaying information about the sweep such as source entity identifiers or sweep parameters such as the type of sweep (e.g., one way sweep), the time each sweep occurs, sweep variant, and scheduled frequency of the sweep. The GUI 300 includes a button for the user to request visualization or simulation of the defined sweep. For example, a user may select the button and a GUI such as those shown in FIGS. 4-6 for simulation may be generated for display. The GUI 300 includes a button for the user to request to edit the sweep definition. The user may select the button and in response, the sweep definition module 121 may cause a GUI such as the GUI 200 to be displayed at the client device.

FIGS. 4A-C depict a user interaction with a GUI 400 for simulating user-defined sweeps, in accordance with one embodiment. In particular, the user interaction is a drag and drop within the GUI 400. FIG. 4A depicts a selection of a list entry 421 displayed in the GUI 400 at the beginning of the drag and drop interaction. FIG. 4B depicts the list entry 421 being dragged over the GUI 400. FIG. 4C depicts the dropped list entry 421 as a new node 416 within a graphical representation presented in the GUI 400. The sweep management system 120 may generate the GUI 400 (e.g., using the simulation module 122) at the client device 111a or 111b. The GUI 400 includes a graphical representation panel 410 and an entity list panel 420. In other embodiments, the GUI 400 contains different, additional, or fewer elements.

As described in the description of FIG. 1, a user interface may be generated using various collections of display routines. While the overall interface of the GUI 400 may be generated using one collection of display routines, certain components of the GUI 400 may be generated using another collection of display routines. For example, entity list submodule 123 may generate the overall interface of the GUI 400 using React, including the entity list panel 420. The graphical representation submodule 124 may generate the graphical representation on the panel 410 using D3. In some embodiments, the graphical representation panel 410 may be an element in a DOM representing the GUI 400, where the element is added to the DOM by the entity list submodule 123. In particular, the element may be a shared web element like an SVG object that is accessible by the graphical representation submodule 124 to generate the graphical representation on the panel 410.

As shown in FIG. 4A, in the graphical representation panel 410 of the GUI 400, the sweep management system 120 displays a structure representative of the relationship between destination and source entities according to user-defined sweeps. This structure may be referred to herein as a "graphical representation." One or more sweep definitions may be represented through the graphical representation. In some embodiments, the graphical representation is a chart of nodes organized in a hierarchy, where each node represents a source or destination entity in the sweep. For example, the graphical representation in the panel 410 includes nodes 411, 412, 413, and 414 arranged in a hierarchy. At the top of the hierarchy may be a node representing an entity with control over entities below it. For example, the node 411 represents a Primary Entity (e.g., Restaurant Corporation) and in particular, a bank account for the Primary Entity. The node 411 may display a user-specified name of "Entity MSTR.0," the bank account number of 00987654321, and an asset balance of 123,456,789.00 US dollars. The nodes 412 and 413 are at the second tier of the graphical representation, below the node 411. Displayed at the nodes 412 and 413 are the entity names, user-specified names, and asset balances. Furthermore, the nodes 412 and 413 also include indicators of whether the entity is involved in a sweep or cover with connected entities. A connection may be a connection to a node in an adjacent tier or a node in a non-adjacent tier to which there is a path through an adjacent tier.

In the example graphical representation shown in the panel 410, the node 413 is depicted as in a sweep with the node 411 or node 414. The default direction of a sweep may be upward in the hierarchy, indicating that node 413 represents a source entity in a sweep with a destination entity represented by node 411. Likewise, the upward sweep direction may indicate that the node 413 or the node 411 represents the destination entity for assets transferred from the source entity represented by the node 414.

In the entity list panel 420, the sweep management system 120 displays a list with entries representing respective entities that may be available to add to the sweep structure shown in the graphical representation panel 410. A user may modify the sweep structure using the GUI 400 by dragging a list entry from the list entry panel 420 and dropping the list entry into the graphical representation panel 410. The drag and drop operation may begin with a selection of the list entry 421 as shown in FIG. 4A. The selection may be a user interaction detected by an event listener (e.g., a drag-enter listener) of the simulation module 122. After detecting the user interaction, another event listener (e.g., a drag-over listener) may be used to determine that the user is moving the list entry 421 and locations in the GUI 400 that the user is moving the list entry 421. For example, a drag-over listener of the simulation module 122 may determine a target node to which the user may connect a new node representing an entity (e.g., Entity 1.0) associated with the list entry 421.

As shown in FIG. 4B, the selected list entry 421 may be dragged to the graphical representation panel 410. The simulation module 122 may determine that a target node where the user could drop the list entry 421 into the graphical representation is the node 414. As described in the description of FIG. 1 and depicted in FIG. 7, the graphical representation submodule 124 may divide the graphical representation into sections for each node (e.g., creating a Voronoi context) and determine a target node using the boundaries of the division (e.g., using a Voronoi "find" function). The graphical representation submodule 124 may determine that the list entry 421 may be placed beneath the target node (i.e., connected between the node 414 and the node 415). For example, the graphical representation submodule 124 executes a callback function with an argument of the node identifiers for the nodes 414 and 415 to determine whether the nodes 414 and 415 may, according to entity information or the sweep definitions, have a node representing Entity 1.0 between them. This callback function may cause the entity list submodule 123 to perform a check with the entity information or the sweep definitions. If Entity 1.0 may be placed between Entity 2.2 of the node 414 and Entity 2.5 of the node 415, then the simulation module 122 may display the dropped list entry as a new node 416 within the graphical representation panel 410 as shown in FIG. 4C. Otherwise, the simulation module 122 may maintain the display of the graphical representation without the new node 416 corresponding to the list entry 421.

After the node 416 is created in the graphical representation, the simulation module 122 may automatically determine sweep definitions (e.g., relating the node 416 to the node 414 or 415) or generate a panel on the GUI 400 prompting the user to define or confirm sweep definitions. For example, the simulation module 122 may automatically apply the existing sweep definition between the nodes 414 and 415 as the sweep definition between the nodes 414 and 416 or between the nodes 416 and 415. A sweep definition specifying that the node 414 is a destination node and the node 415 is the source node may be modified to specify that the node 414 is a destination and the node 416 is the source node. An additional sweep definition may be created to specify that the node 416 is a destination node and the node 415 is the source node. Sweep parameters such as a target balance within the source node 415 may be carried over to a sweep definition with the source node 416. For example, a target balance of one thousand US dollars in a sweep definition between the nodes 414 and 415 may be carried over such that the target balance is still one thousand US dollars in a sweep definition between the nodes 414 and 416. The simulation module 122 may save modifications to sweep definitions or add new sweep definitions in the datastore 125.

Figure 5:
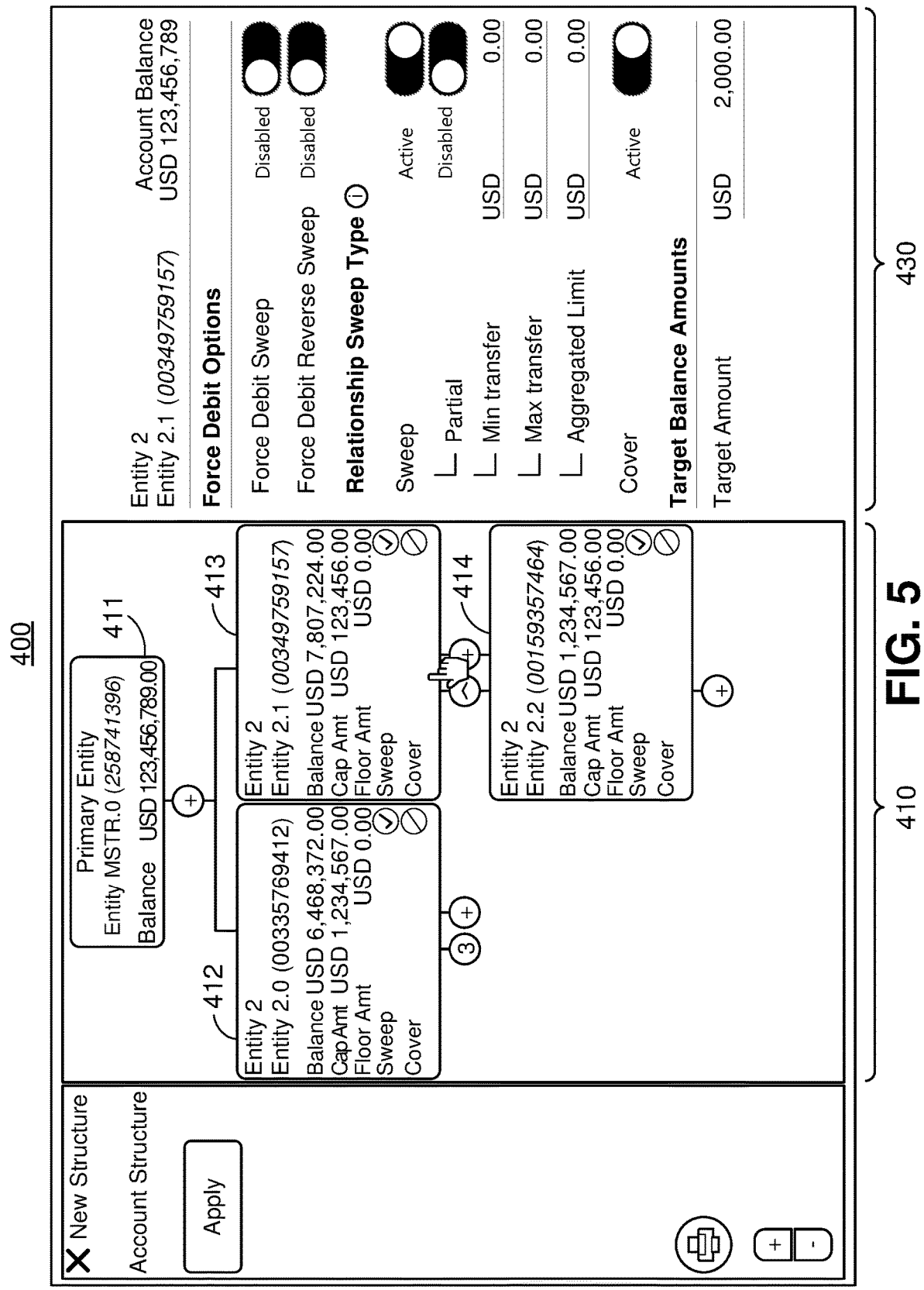
FIG. 5 depicts the GUI of FIG. 4 in a configuration with sweep options for allowing a user to modify a sweep definition, according to one embodiment.

FIG. 5 depicts the GUI 400 in a configuration with sweep options for allowing a user to modify a sweep definition, in accordance with one embodiment. The simulation module 122 may determine a user interaction has occurred where the user has clicked the node 413 in the graphical representation panel 410. In response, the simulation module 122 may execute a callback function prompting the generation of an entity options panel 430. The entity options panel 430 includes various user interface inputs for modifying a sweep definition relative to a selected entity (e.g., Entity 2.1). The user may interact with the entity options panel 430 and the simulation module 122 may update the display of the graphical representation to reflect the interactions. For example, a user may change the target asset amount for Entity 2.1. The entity options panel 430 may include different, additional, or fewer elements than shown in FIG. 5. For example, the entity options panel 430 may include additional input text fields for defining an asset balance range that must be maintained within the Entity 2.1 (e.g., sweeps occur to maintain this range).

Figure 6:
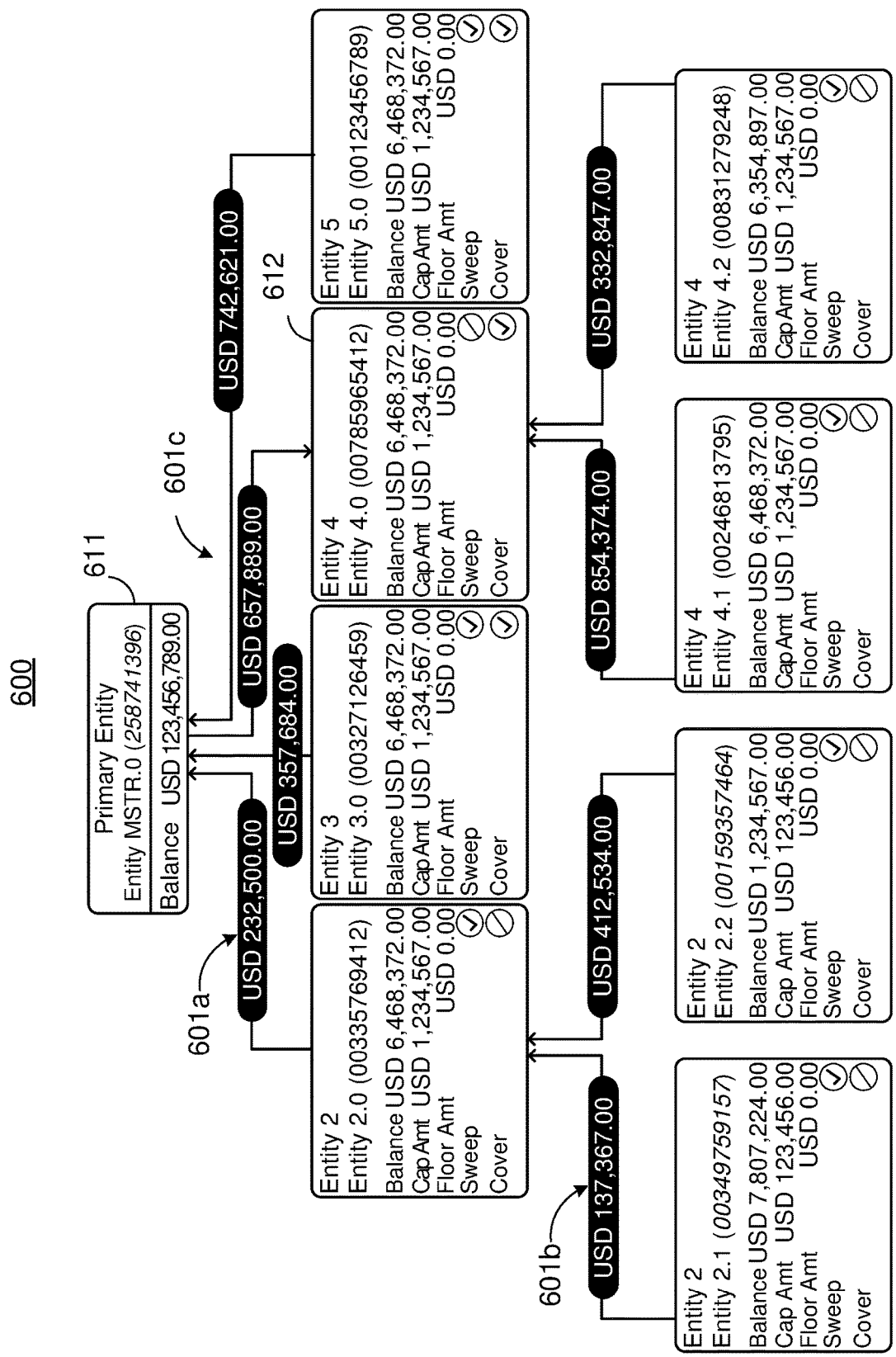
FIG. 6 depicts a GUI for visualizing a simulated sweep, according to one embodiment.

FIG. 6 depicts a GUI 600 for visualizing a simulated sweep, in accordance with one embodiment. The sweep management system 120 may generate the GUI 600 (e.g., using the simulation module 122) at the client device 111a or 111b. The GUI 600 includes animations 601a-c between nodes in a graphical representation. In other embodiments, the GUI 600 contains different, additional, or fewer elements. For example, in a detailed view of the graphical representation, there may be additional animation arrows depicted between the nodes.

The GUI 600 may enable a user to visualize the transfer of assets between entities. The GUI 600 may present the simulation of a sweep over time. For example, the GUI 600 may update at a user-specified frequency (e.g., every second) with a simulated sweep state for each hour within a day. The GUI 600 includes animation arrows such as animations 601a-c indicating the amount and direction of assets transferred during a sweep. In some embodiments, the simulation includes a cover for an entity rather than or in addition to a sweep. For example, the node 612 is shown as having a cover set up to obtain assets from the node 611, and an animation 601c reflects the corresponding direction of assets being transferred. The animation 601a reflects the transfer of assets from Entity 2.0 to Entity MSTR.0. The animation 601b reflects the transfer of assets from Entity 2.1 to Entity 2.0 or Entity MSTR.0.

FIG. 7 depicts one embodiment of a divided graphical representation 700 for simulating sweeps. The representation 700 may be a portion of larger GUI (e.g., GUIs 400 or 600) for simulating sweeps. In particular, the representation 700 may be a portion of a graphical representation (e.g., included in the graphical representation panel 410). In the embodiment shown, the divided graphical representation 700 includes sections 701, 702, and 703 and a node 710 that is shown as being moved from a first location within the section 703 to the section 702.

The simulation module 122 (e.g., the graphical representation submodule 124) may determine, for each node, sections by which the graphical representation is divided. Each section is defined by boundaries that may be shared with the boundaries of other sections. For example, the graphical representation submodule 124 determines the section 701 for the node representing Entity 3.0, the section 702 for the node representing Entity 2.4, and the section 703 for the node representing Entity 2.3. The sections are separated according to the boundaries shown in FIG. 7 through dotted lines. For example, a boundary 704 separates the sections 701 and 702, a boundary 705 separates the sections 701 and 703, and a boundary 706 separates the sections 702 and 703. The graphical representation submodule 124 may create a Voronoi context to determine the sections. In some embodiments, the boundaries are displayed to the user during an operation where the boundaries are involved (e.g., during a drag and drop operation).

The simulation module 122 may determine that a user interaction has occurred that includes the selection and dragging of the node 710 across the boundary 706. As the user drags the node 710, the simulation module 122 may determine the nearest node. For example, the graphical representation submodule 124 may use a Voronoi "find" function to determine the node nearest to the dragged node 710. In some embodiments, the graphical representation submodule 124 may display guidance markers such as a line 707 from the dragged node 710 to a nearest node or a position indicator 708. The position indicator may be generated beneath each node in the graphical representation. Alternatively, the simulation module 122 may determine, using entity information or sweep definitions, nodes that can be connected to the dragged node 710 and generate position indicators for display beneath the determined nodes. In some embodiments, the simulation module 122 may generate indicators with different appearances based on whether the dragged node 710 can be positioned at the indicator or whether the indicator is associated with the nearest node. For example, a position indicator with a first appearance (e.g., composed of one circle) may be generated by default for each node and the graphical representation submodule 124 may change the appearance of a given indicator to a second appearance (e.g., composed of two concentric circles) when the user has dragged the node 710 over the section with the given indicator.

Process for Updating a User Interface Using a Sweep Management System

Figure 8:
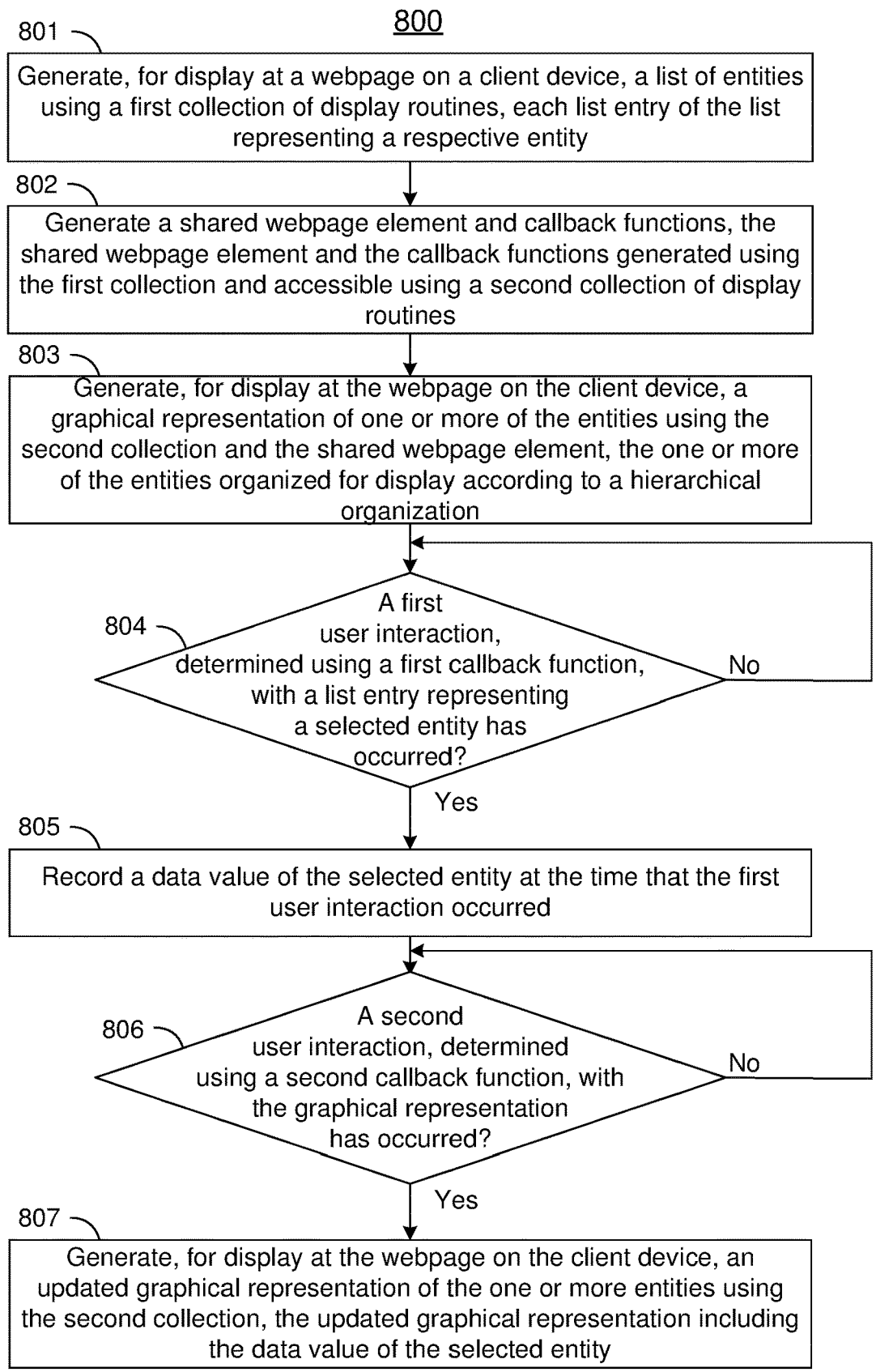
FIG. 8 is a flowchart illustrating a process for updating a user interface based on user interactions, according to one embodiment.

FIG. 8 is a flowchart illustrating a process 800 for updating a user interface based on user interactions, according to one embodiment. The process 800 is illustrated from the perspective of the sweep management system 120 performing the operations of the process 800. However, in some embodiments, some or all of the operations may be performed by other components in the networked computing environment 100. Furthermore, some embodiments may perform some of the operations in parallel or in different orders, or may include different steps. For example, the sweep management system 120 may generate 802 the shared webpage element and callback functions before generating 801 for display the list of entities.

In the embodiment shown in FIG. 8, the sweep management system 120 generates 801, for display at a webpage on a client device, a list of entities using a first collection of display routines, where each list entry of the list may represent a respective entity. The list of entities may be similar to the list displayed in the entity list panel 420 of FIGS. 4A-C. The entity list submodule 124 of the sweep management system 120 may generate the list of entities using a first collection of display routines (e.g., React). Each list entry in the list may be selectable by a user interaction. For example, a user may select a list entry to perform a drag and drop operation. Although described in the process 800 as sharing entities with the graphical representation, the list of entities may not necessarily include the entities that are generated 802 for display in the graphical representation. For example, the list of entities may be representative of entities that are not being simulated according to user-specified sweep definitions in the graphical representation.

The sweep management system 120 generates 802 a shared webpage element and callback functions. The shared webpage element and the callback functions may be generated using the first collection of display routines and accessible using a second collection of display routines (e.g., D3). In some embodiments, the shared webpage element is an SVG object added to a DOM of the webpage by the entity list submodule 123 using React and accessible at the DOM by the graphical representation submodule 124 using D3. Callback functions to perform operations such as moving nodes within the graphical representation, animating the simulation to show the direction of assets transferred between entities, inserting an entity from the entity list into the graphical representation, etc. may be added to the DOM by the entity list submodule 123 using React and accessible at the DOM by the graphical representation submodule 124 using D3.

The sweep management system 120 generates 803, for display at the webpage on the client device, a graphical representation of one or more of the entities using the second collection of display routines and the shared webpage element. For example, the graphical representation submodule 124, using D3, locates the SVG object at the DOM and renders a graphical representation onto the SVG object. The one or more entities may be organized for display according to a hierarchical organization. The graphical representation may represent the one or more entities as nodes, where each entity is represented by a respective node. The graphical representation may be similar to the depiction within the graphical representation panel 410 of FIGS. 4A-C, which includes a representation organized according to a hierarchy.

The sweep management system 120 determines 804, using a first callback function of the callback functions, whether a first user interaction with a list entry in the list has occurred. The list entry may be representative of a selected entity of the entities. The entity list submodule 123 may determine that a user interaction representing a drag of the list entry has occurred in response to the user selecting the list entry for greater than a threshold time or moving the list entry from its original location after selecting the entry. The entity list submodule 123 may use a callback function including an event listener such as the drag-enter listener described in the description of FIG. 1. If the sweep management system 120 determines 804 that the first user interaction has not occurred, the process 800 returns to wait for the first user interaction to occur. For example, the entity list submodule 123 determines that the user has selected the list entry but has not moved the list entry from its original location. If the sweep management system 120 determines 804 that the first user interaction has occurred, the process 800 proceeds to record 805 a data value of the selected entity. For example, as shown in FIGS. 4A-B, the user has selected the list entry 421 and moved it from its original location within the entity list in the entity list panel 420. Accordingly, the entity list submodule 123 may determine that the first user interaction has occurred.

The sweep management system 120 records 805 a data value of the selected entity at the time that the first user interaction occurred. The data value may be information related to the entity. For example, the entity list submodule 123 may record 805 the asset balance of the entity at time that the user begins to drag the list entry to the graphical representation. The entity list submodule 805 may record the data value to the datastore 125 such that the entity dragged and dropped into the simulation may reflect the information about the entity at the time the user selected the entity. The time used as a reference point for recording 805 the data value may be a real world time or a simulated time (e.g., a simulated clock that the simulation module 122 uses to indicate when simulated asset transfers are occurring). In some embodiments, the entity list submodule 123 may record 805 the data value by passing the data value to the graphical representation submodule 124 using a callback function (e.g., the data value is passed as an argument in the callback function).

The sweep management system 120 determines 806, using a second callback function of the callback functions, whether a second user interaction occurred with the graphical representation. The entity list submodule 123 or the graphical representation submodule 124 may determine, using a callback function including an event listener (e.g., a drop listener), that a user interaction representing a drop of the list entry into the graphical representation has occurred. If the sweep management system 120 determines 806 that the second user interaction has not occurred, the process 800 returns to wait for the second user interaction to occur. For example, the entity list submodule 123 determines that the user has not dropped the list entry because the drop listener has not detected the drop that would trigger a call to a function to determine whether the entity represented by the list entry can be properly placed in the user's requested location within the graphical representation. If the sweep management system 120 determines 806 that the second user interaction has occurred, the process 800 proceeds to generate 807 an updated graphical representation.

The sweep management system 120 generates 807, for display at the webpage on the client device, an updated graphical representation of the one or more plurality of entities using the second collection. The updated graphical representation may include the data value of the selected entity. For example, as shown in FIG. 4C, the graphical representation in the panel 410 has updated to include a new node 416 corresponding to the list entry 421 of FIGS. 4A-4B that was dragged over to the graphical representation. In an example where the recorded 805 data value of the entity associated with the list entry is the asset balance of the entity, the node in the updated graphical representation includes the asset balance. For example, the node 416 includes the asset balance of Entity 1.0. The graphical representation submodule 124 may use D3 to generate the updated graphical representation with the node 416. Although not shown in the process 800, the sweep management system 120 may perform an additional operation prior to generating 807 the updated graphical representation to confirm that the dropped location of the list entry is valid. For example, the graphical representation submodule 124 may execute a function with identifiers of the entities to which the list entry would be connected to (e.g., the nodes 414 and 415 in FIG. 4C), prompting the entity list submodule 123 to confirm, using entity information or sweep definitions, that the drop is a valid (e.g., that the node 416 can be placed between the nodes 414 and 415).

Computing System Architecture

Figure 9:
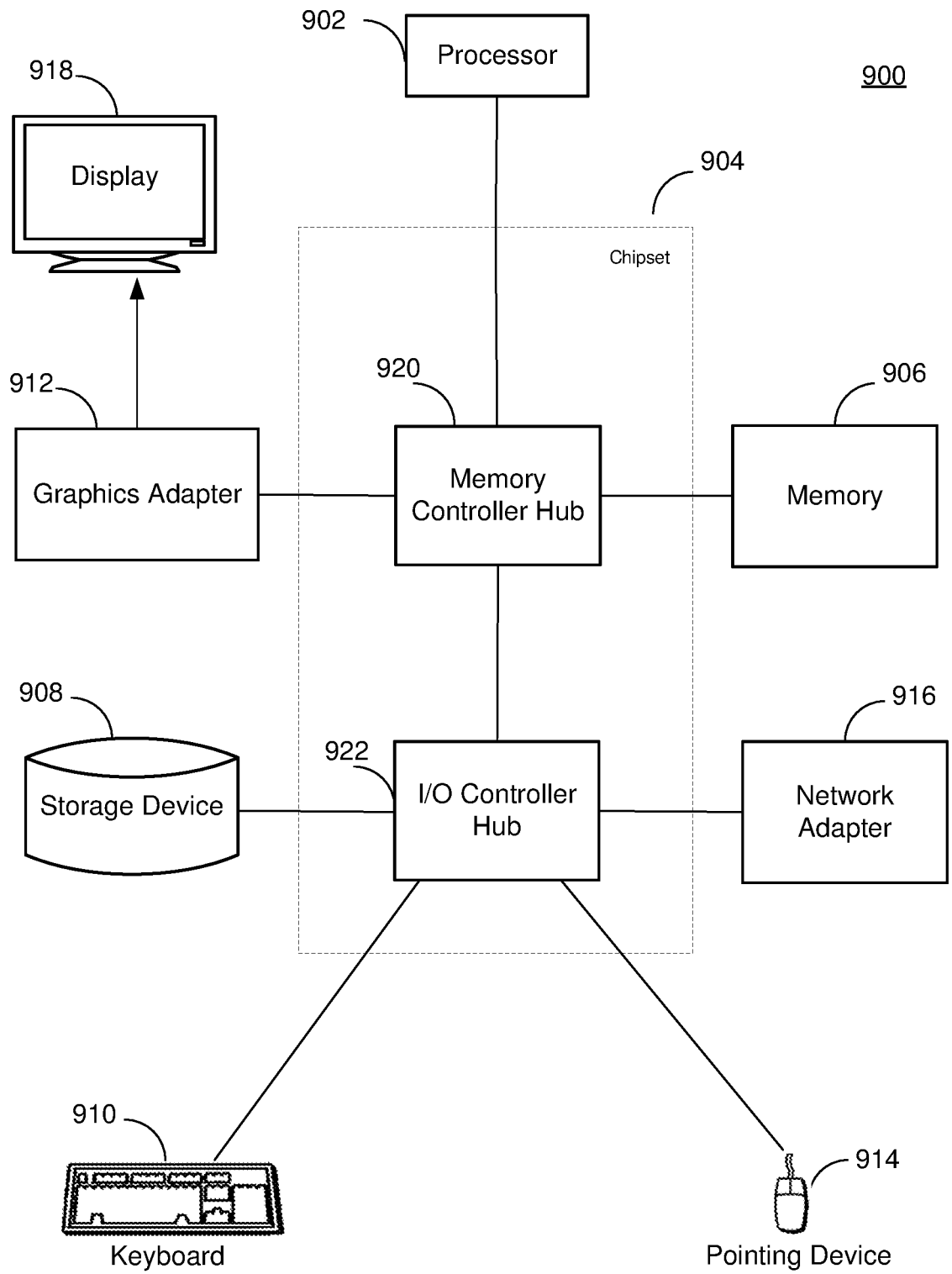
FIG. 9 depicts a block diagram illustrating an example computer suitable for use as a server for a sweep management system or client device, according to one embodiment.

FIG. 9 is a block diagram illustrating an example computer 900 suitable for use as a server for the sweep management system 120 or client device 111a or 111b. The example computer 900 includes at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, keyboard 910, pointing device 914, and network adapter 916 are coupled to the I/O controller hub 922. Other embodiments of the computer 900 have different architectures.

In the embodiment shown in FIG. 9, the storage device 908 is a non-transitory computer-readable storage medium such as a hard drive, compact disk read-only memory (CD-ROM), DVD, or a solid-state memory device. The memory 906 holds instructions and data used by the processor 902. The pointing device 914 is a mouse, track ball, touch-screen, or other type of pointing device, and is used in combination with the keyboard 910 (which may be an on-screen keyboard) to input data into the computer system 900. The graphics adapter 912 displays images and other information on the display 918. The network adapter 916 couples the computer system 900 to one or more computer networks.

The types of computers used by the clients of FIG. 1 can vary depending upon the embodiment and the processing power required by the client. For example, a server on which the sweep management system 120 resides might include a distributed database system comprising multiple servers working together to provide the functionality described. Furthermore, the computers can lack some of the components described above, such as keyboards 910, graphics adapters 912, and displays 918.

Additional Considerations

Some portions of the preceding detailed descriptions have been presented in terms of algorithms and symbolic representations of operations on data bits within a computer memory. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. The software modules described herein may be embodied as program code (e.g., software comprised of instructions stored on non-transitory computer readable storage medium and executable by at least one processor) or hardware (e.g., application specific integrated circuit (ASIC) chips or field programmable gate arrays (FPGA) with firmware). The modules correspond to at least having the functionality described herein when executed/operated.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable medium comprising stored instructions for communicating between collections of display routines, the instructions, when executed by a computing system, causing the computing system to perform operations including:
    causing a webpage to be displayed on a client device, the webpage including a first graphical representation of a plurality of entities and a second graphical representation of a subset of the plurality of entities, the first graphical representation being generated using a first collection of display routines and the second graphical representation being generated using a second collection of display routines and a shared webpage element, wherein the shared webpage element was generated using the first collection of display routines;
    determining, using one or more callback functions, that a user interaction with the first graphical representation has occurred; and
    responsive to the user interaction with the first graphical representation, causing the webpage to display, using the second collection of display routines and the shared webpage element, an updated version of the second graphical representation.

2. The non-transitory computer readable medium of claim 1, wherein the user interaction includes a drag and drop of a user interface element from a first location on the first graphical representation to a second location on the second graphical representation.

3. The non-transitory computer readable medium of claim 1, wherein the one or more callback functions include at least one of a drag-enter listener, a drag-over listener, or a drop listener.

4. The non-transitory computer readable medium of claim 1, wherein the first graphical representation of the plurality of entities is divided into a plurality of sections, each section associated with a respective entity and a respective drag-enter listener.

5. The non-transitory computer readable medium of claim 1, wherein the one or more callback functions includes a drag-enter listener and wherein determining that the user interaction with the first graphical representation has occurred comprises determining, using the drag-enter listener, that the user has clicked a list entry from the first graphical representation.

6. The non-transitory computer readable medium of claim 1, further comprising, responsive to determining that the user interaction with the first graphical representation has occurred, determining, using a drag-over listener, a nearest graphical node of the second graphical representation, the nearest graphical node representative of a target entity of the plurality of entities, the second graphical representation including a plurality of graphical nodes each associated with a respective entity and a respective webpage location eligible for a drop event.

7. The non-transitory computer readable medium of claim 6, wherein determining the nearest graphical node of the second graphical representation comprises:
    determining, using the drag-over listener, a current webpage location of a user interface element dragged over from the first graphical representation to the second graphical representation during the user interaction; and
    determining that the current webpage location is within a boundary of the nearest graphical node, each of the plurality of graphical nodes further associated with respective boundaries between other graphical nodes within the second graphical representation.

8. The non-transitory computer readable medium of claim 1, further comprising:
    determining, using a drop listener of the one or more callback functions, that the user has released a user interface element at a webpage location of the second graphical representation,
    wherein causing the webpage to display the updated version of the second graphical representation is further responsive to determining that the user has released the user interface element at the webpage location of the second graphical representation.

9. The non-transitory computer readable medium of claim 8, wherein generating the updated version of the second graphical representation is further responsive to verifying the webpage location is a valid location to release the user interface element by:
  determining, using the webpage location, an identifier of a nearest graphical node in the second graphical representation to which the user interface element is released, the nearest graphical node representative of a target entity of the plurality of entities; and
  verifying, using the identifier, a relationship exists between an entity represented by the user interface element and the target entity.

10. The non-transitory computer readable medium of claim 1, wherein one or more of the callback functions includes a zoom callback function, and wherein the user interaction is a first user interaction, further comprising:
  receiving a second user interaction with the second graphical representation, the second user interaction indicative of a request to adjust a size of a graphical node of the second graphical representation; and
  modifying, using the zoom callback function, an amount of information displayed at the graphical node, wherein the modification corresponds to an increase or a decrease of the size of the graphical node within the second graphical representation.

11. The non-transitory computer readable medium of claim 1, wherein the one or more callback functions includes an animate callback function, further comprising generating, using the animate callback function, an animation of content transferred between two graphical nodes within the second graphical representation.

12. The non-transitory computer readable medium of claim 1, wherein the one or more callback functions includes a node-click callback function, and wherein the user interaction is a first user interaction, further comprising:
  receiving a second user interaction with the second graphical representation, the second user interaction including a click of a graphical node of the second graphical representation; and
  distinguishing, using the node-click callback function, a user interface element within the first graphical representation, the user interface element and the graphical node representative of the same entity of the plurality of entities.

13. The non-transitory computer readable medium of claim 1, wherein the one or more callback functions includes a move-node callback function, and wherein the user interaction is a first user interaction, further comprising:
  receiving a second user interaction with the second graphical representation, the second user interaction representative of a request to move a graphical node at a first webpage location to a second webpage location associated with a target graphical node of the second graphical representation, the graphical node representative of a given entity, the target graphical node representative of a target entity;
  verifying, using the move-node callback function, a relationship between the given entity and the target entity;
  responsive to the relationship being unverified, displaying the graphical node at the first webpage location to indicate that the requested move has been rejected; and
  responsive to the relationship being verified, displaying the graphical node at the second webpage location to indicate that the requested move has been accepted.

14. The non-transitory computer readable medium of claim 1, wherein the plurality of entities includes one or more of a financial account for a bank, a profile of an individual in an organization, or a process in a manufacturing facility.

15. The non-transitory computer readable medium of claim 1, wherein the first collection of display routines and the second collection of display routines are of a plurality of collections of display routines, each collection configured to manage webpage elements within a representation of the webpage.

16. The non-transitory computer readable medium of claim 15, wherein the representation of the webpage is a document object model (DOM) and wherein the first collection of display routines and the second collection of display routines are different JavaScript® libraries.

17. The non-transitory computer readable medium of claim 1, wherein the shared webpage element is a scalable vector graphic (SVG) object.

18. A computer system comprising:
  at least one processor; and
  a non-transitory computer readable medium comprising stored instructions for communicating between collections of display routines, the instructions when executed by the at least one processor causing the at least one processor to:
    cause a webpage to be displayed on a client device, the webpage including a first graphical representation of a plurality of entities and a second graphical representation of a subset of the plurality of entities, the first graphical representation being generated using a first collection of display routines and the second graphical representation being generated using a second collection of display routines and a shared webpage element, wherein the shared webpage element was generated using the first collection of display routines;
    determine, using one or more callback functions, that a user interaction with the first graphical representation has occurred; and
    responsive to the user interaction with the first graphical representation, cause the webpage to display, using the second collection of display routines and the shared webpage element, an updated version of the second graphical representation.

19. The computer system of claim 18, wherein the user interaction includes a drag and drop of a user interface element from a first location on the first graphical representation to at a second location on the second graphical representation.

20. The computer system of claim 18, wherein the first collection of display routines and the second collection of display routines are each configured to manage webpage elements within a representation of the webpage, the representation of the webpage is a document object model (DOM), and the first collection of display routines and the second collection of display routines are different JavaScript® libraries.

21. A method for communicating between collections of display routines, the method comprising:
  causing a webpage to be displayed on a client device, the webpage including a first graphical representation of a plurality of entities and a second graphical representation of a subset of the plurality of entities, the first graphical representation being generated using a first collection of display routines and the second graphical representation being generated using a second collection of display routines and a shared webpage element, wherein the shared webpage element was generated using the first collection of display routines;

determining, using one or more callback functions, that a user interaction with the first graphical representation has occurred; and responsive to the user interaction with the first graphical representation, causing the webpage to display, using the second collection of display routines and the shared webpage element, an updated version of the second graphical representation.

22. The method of claim 21, wherein the user interaction includes a drag and drop of a user interface element from a first location on the first graphical representation to at a second location on the second graphical representation.

23. The method of claim 21, wherein the first collection of display routines and the second collection of display routines are each configured to manage webpage elements within a representation of the webpage, the representation of the webpage is a document object model (DOM), and the first collection of display routines and the second collection of display routines are different JavaScript® libraries.

* * * * *